United States Patent
Chen et al.

(10) Patent No.: US 12,542,983 B2
(45) Date of Patent: Feb. 3, 2026

(54) SERVICE CONFIGURATION METHOD AND APPARATUS

(71) Applicant: HUAWEI TECHNOLOGIES CO., LTD., Guangdong (CN)

(72) Inventors: Wei Chen, Wuhan (CN); Yu Zheng, Dongguan (CN); Yi Lin, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 322 days.

(21) Appl. No.: 18/342,169

(22) Filed: Jun. 27, 2023

(65) Prior Publication Data

US 2023/0345154 A1    Oct. 26, 2023

Related U.S. Application Data

(63) Continuation of application No. PCT/CN2021/139982, filed on Dec. 21, 2021.

(30) Foreign Application Priority Data

Dec. 31, 2020   (CN) .......................... 202011618703.2

(51) Int. Cl.
    *H04Q 11/00*    (2006.01)
(52) U.S. Cl.
    CPC ..... *H04Q 11/0062* (2013.01); *H04Q 11/0003* (2013.01); *H04Q 2011/0086* (2013.01)
(58) Field of Classification Search
    CPC .................................................. H04Q 11/0062
    See application file for complete search history.

(56) References Cited

U.S. PATENT DOCUMENTS

| 2002/0109879 | A1  | 8/2002 | Wing So |
| 2016/0050044 | A1* | 2/2016 | Liu ................. H04J 14/086 398/98 |
| 2018/0123879 | A1* | 5/2018 | Bai .................. H04L 41/5041 |

(Continued)

FOREIGN PATENT DOCUMENTS

| CN | 1529518 A   | 9/2004 |
| CN | 101860473 A | 10/2010 |

(Continued)

OTHER PUBLICATIONS

Farrel et al., "A Path Computation Element (PCE)-Based Architecture", RFC-4655, IETF, Aug. 2006 (Year: 2006).*

(Continued)

*Primary Examiner* — Shi K Li
(74) *Attorney, Agent, or Firm* — Fish & Richardson P.C.

(57) ABSTRACT

This application relates to example service configuration methods and example apparatuses. In one example method, a first optical transport network (OTN) device receives a first message from an optical line terminal (OLT) device, where the first message includes first address information of a service. The first OTN device determines, based on the first message, whether a first path has been established in an OTN, where the first path is used to transmit data of the service, and the first path satisfies the first address information. The first OTN device establishes a path for transmitting data of the service or adjusts a bandwidth of the established first path based on a result of the determining.

18 Claims, 6 Drawing Sheets

(56) References Cited

U.S. PATENT DOCUMENTS

2018/0123945 A1* 5/2018 Wang .................. H04L 45/42
2019/0313167 A1* 10/2019 Lee .................... H04L 41/5051
2023/0403487 A1* 12/2023 Li ...................... H04L 12/4645

FOREIGN PATENT DOCUMENTS

| CN | 102413391 A | 4/2012 |
| CN | 108306750 A | 7/2018 |
| CN | 111226422 A | 6/2020 |
| WO | 2007113645 A2 | 10/2007 |

OTHER PUBLICATIONS

Vasseur et al., "Path Computation Element (PCE) Communication Protocol", RFC-5440, IETF, Mar. 2009 (Year: 2009).*
International Search Report and Written Opinion in International Appln. No. PCT/CN2021/139982. mailed on Mar. 9, 2022, 15 pages (with English translation).
Extended European Search Report in European Appln. No. 21914030.8, mailed on Apr. 29, 2024, 9 pages.

* cited by examiner

| Object-Class | OT | Reserved | P | I | Object Length |
|---|---|---|---|---|---|
| Out Interface IP ||||||
| Next Hop IP ||||||

FIG. 4

| Object-Class | OT | Reserved | P | I | Object Length |
|---|---|---|---|---|---|

FIG. 5

SERVICE CONFIGURATION METHOD AND APPARATUS

CROSS-REFERENCE TO RELATED APPLICATIONS

This application is a continuation of International Application No. PCT/CN2021/139982, filed on Dec. 21, 2021, which claims priority to Chinese Patent Application No. 202011618703.2, filed on Dec. 31, 2020. The disclosures of the aforementioned applications are hereby incorporated by reference in their entireties.

TECHNICAL FIELD

This application relates to the field of communication technologies, and in particular, to a service configuration method and an apparatus.

BACKGROUND

In emerging services such as virtual reality (VR) games, cloud games, and ultra-HD videos, users are increasingly demanding network quality with a low delay and low jitter. An optical transport network (OTN) can provide committed bandwidth isolation and stable delay performance, which is suitable for such services.

For a user equipment (UE), a path of a service of the UE in the OTN is preconfigured. In addition, because the path is preconfigured, a parameter (for example, a parameter such as a bandwidth) of the path cannot be adjusted subsequently. Therefore, to ensure quality of experience of a user, a bandwidth is reserved for the path based on a peak demand of the user during initial configuration of the path. That is, currently, a bandwidth configured for a preconfigured path is large. However, the UE may not always perform the corresponding service. For example, the user may play a game for hours and then stop, that is, the user may not be always in a state of playing the game. The path that has been established for the service of the UE is not deleted. Even if the user does not use the path, the path still exists, and a resource such as a bandwidth configured for the path cannot be occupied by another user or another service. This results in a huge waste of resources on an entire network and high network construction costs.

SUMMARY

Embodiments of this application provide a service configuration method and an apparatus, to save resources and reduce network construction costs.

According to a first aspect, a service configuration method is provided. The method may be performed by a first apparatus. The first apparatus is, for example, an OTN device, or a chip system disposed in the OTN device, or the first apparatus is, for example, an access network controller. In the following description, an example in which the first apparatus is an OTN device is used, and the OTN device used as the first apparatus is referred to as a first OTN device. The first OTN device receives a first message from an OLT device, where the first message includes first address information of a service. The first OTN device determines, based on the first message, whether a first path has been established in an OTN, where the first path is used to transmit the service, and the first path satisfies the first address information. The first OTN device establishes a path for transmitting the service or adjusts a bandwidth of the established first path based on a result of the determining. That the first path satisfies the first address information may also be referred to as that the first path corresponds to the first address information, or the like. This may be understood as that a path determined based on the first address information is the first path. In other words, the first path is determined based on the first address information. In other words, a path may be determined in the OTN based on the first address information, and the path is the first path.

In embodiments of this application, a path in an OTN may be established for a service when a terminal device initiates the service. In other words, there is no need to maintain the path for the service in the OTN continuously, thereby reducing a waste of resources, improving a utilization rate of resources, and reducing network construction costs. Alternatively, a bandwidth of an established path may be adjusted when a terminal device initiates a service. In this case, even if a path of the service in an OTN is maintained, the path may be maintained based on a relatively small bandwidth, and the bandwidth may be adjusted only when the path needs to be used. In this way, a waste of resources can be reduced. In addition, in embodiments of this application, because a path of a service in an OTN may be established for the service when the service is initiated, or a bandwidth of an established path may be adjusted, a bandwidth may be configured for the corresponding path based on an actual requirement of the service instead of based on a peak requirement of a user. This can further reduce a waste of resources.

In an optional implementation, the first address information includes one or more of the following: a source IP address of the service, a destination IP address of the service, an egress address of the service on the first OTN device, and a next-hop address of the service after the service passes through the OTN. The source IP address of the service is an IP address of a terminal device that requests the service, and the destination IP address of the service is an IP address of an application server that provides the service. The first message includes the first address information. In this way, the first OTN device can determine whether the first path has been established in the OTN. When no first path has been established in the OTN, the first OTN device can also establish a path based on the first address information, to satisfy a transmission requirement of the service.

In an optional implementation, that the first OTN device determines, based on the first message, whether a first path has been established in an OTN includes: The first OTN device determines second address information based on the first address information, where the second address information includes a source device identifier, a destination device identifier, and a slot number of the first path in the OTN. The first OTN device determines, based on the second address information, whether the first path has been established in the OTN. A manner in which the first OTN device determines whether the first path has been established in the OTN is provided herein.

In an optional implementation, that the first OTN device establishes a path for transmitting the service based on a result of the determining includes: The first OTN device sends a second message to a CCU when the first path has not been established in the OTN, where the second message is used to request to establish a second path for transmitting the service. If the first path is not established in the OTN, the first OTN device may request to establish the second path, to satisfy the transmission requirement of the service. It may be seen that in embodiments of this application, when a path is not used, the path may be deleted, and a path may be established only when the path needs to be used. In this way, a waste of resources can be effectively reduced.

In an optional implementation, the second message further includes second address information, where the second address information includes a source device identifier, a destination device identifier, and a slot number of the second path in the OTN, and the second address information is obtained based on the first address information. To request to establish the second path, the second address information may be sent to a CCU, where the second address information is equivalent to a description of the second path, so that the CCU determines which path the second path is.

In an optional implementation, that the first OTN device adjusts a bandwidth of the established first path based on a result of the determining includes: When the first path has been established in the OTN, the first OTN device determines whether the bandwidth of the first path satisfies a bandwidth requirement of the service. When the bandwidth of the first path does not satisfy the bandwidth requirement of the service, the first OTN device sends a second message to a CCU, where the second message is used to request to adjust the bandwidth of the first path, and an adjusted bandwidth can satisfy the bandwidth requirement of the service. If the first path already exists, the first path may continue to be used, and a new path does not need to be established, thereby reducing signaling consumption caused by establishing the new path. However, a parameter of the existing first path may not satisfy a current requirement of the service. For example, the bandwidth of the first path may not satisfy the bandwidth requirement of the service. In this case, the first OTN device may request to adjust the bandwidth of the first path, so that the adjusted bandwidth can satisfy a requirement of the service.

In an optional implementation, the first message is a PCEP message. Alternatively, the first message may be another type of message. This is not limited.

In an optional implementation, the PCEP message is further used to indicate to update a path. For example, establishing a path or adjusting a parameter (for example, a bandwidth) of an existing path may be regarded as updating a path.

In an optional implementation, the method further includes the following steps: The first OTN device receives a third message from the OLT device, where the third message is used to request to delete a path of the service in the OTN. The first OTN device sends a fourth message to the CCU, where the fourth message is used to request to delete the path of the service in the OTN. When a service does not need to be performed, a path of the service in an OTN may be deleted, or a bandwidth of the path of the service in the OTN may be reduced, to reduce a waste of resources. For example, if a terminal device does not perform a service for a long time, a path of the service in an OTN may be deleted, to reduce a waste of resources to a greater extent.

In an optional implementation, the method further includes the following steps: The first OTN device receives a third message from the OLT device, where the third message is used to request to adjust a bandwidth of a path of the service in the OTN. The first OTN device sends a fourth message to the CCU, where the fourth message is used to request to adjust the bandwidth of the path of the service in the OTN, and an adjusted bandwidth is smaller than the bandwidth before the adjustment. Optionally, the first OTN device may further receive a seventh message from the CCU, where the seventh message indicates whether the bandwidth of the path of the service in the OTN can be adjusted. When a service does not need to be performed, a path of the service in an OTN may be deleted, or a bandwidth of the path of the service in the OTN may be reduced, to reduce a waste of resources. For example, when a terminal device may not perform a service for a short period of time, and may perform the service again after a period of time, a bandwidth of a path of the service in an OTN may be adjusted to reduce a waste of resources. In addition, the path of the service in the OTN can be maintained, thereby reducing resource consumption caused by path establishment.

According to a second aspect, another service configuration method is provided. The method may be performed by a second apparatus. The second apparatus is, for example, an OLT device or a chip system disposed in the OLT device. In the following description, an example in which the second apparatus is an OLT device is used. An OLT device receives a first signaling from a terminal device, where the first signaling is used to request to configure a service. The OLT device sends a first message to a first OTN device, where the first message is used to determine a path of the service in an OTN, and the first message includes first address information of the service.

In an optional implementation, the first address information includes one or more of the following: The first address information includes a source IP address of the service, a destination IP address of the service, an egress address of the service on the first OTN device, and a next-hop address of the service after the service passes through the OTN. The source IP address of the service is an IP address of a terminal device that requests the service, and the destination IP address of the service is an IP address of an application server that provides the service.

In an optional implementation, the first message is a PCEP message.

In an optional implementation, the PCEP message is used to indicate to update a path.

In an optional implementation, the method further includes the following steps: The OLT device receives a fifth message from the first OTN device, where the fifth message is used to indicate whether the path of the service in the OTN is available or unavailable.

In an optional implementation, the method further includes the following steps: The OLT device sends a third message to the first OTN device, where the third message is used to request to delete the path of the service in the OTN, or is used to request to adjust a bandwidth of the path of the service in the OTN.

For technical effects brought by the second aspect or the optional implementations of the second aspect, refer to the description of technical effects of the first aspect or the corresponding implementations.

According to a third aspect, a communication apparatus is provided. The communication apparatus may be the first apparatus according to any one of the first to second aspects. The communication apparatus has a function of the first apparatus. In an optional implementation, the communication apparatus includes a baseband apparatus and a radio frequency apparatus. In another optional implementation, the communication apparatus includes a processing unit (sometimes also referred to as a processing module) and a transceiver unit (sometimes also referred to as a transceiver module). The transceiver unit can implement a sending function and a receiving function. When the transceiver unit implements the sending function, the transceiver unit may be referred to as a sending unit. When the transceiver unit implements the receiving function, the transceiver unit may be referred to as a receiving unit. The sending unit and the receiving unit may be a same functional module. The functional module is referred to as a transceiver unit, and the functional module can implement a sending function and a receiving function. Alternatively, the sending unit and the receiving unit may be different functional modules, and the transceiver unit is a collective name for these functional modules.

For example, the transceiver unit (or the receiving unit) is configured to receive a first message from an optical line terminal OLT device, where the first message includes first address information of a service.

The processing unit is configured to determine, based on the first message, whether a first path has been established in an OTN, where the first path is used to transmit the service, and the first path satisfies the first address information.

The processing unit is further configured to establish a path for transmitting the service or adjust a bandwidth of the established first path based on a result of the determining.

In still another optional implementation, the communication apparatus includes a storage unit and a processing unit. The processing unit is configured to be coupled to the storage unit, and perform a program or instructions in the storage unit, to enable the communication apparatus to perform a function of the first apparatus.

According to a fourth aspect, another communication apparatus is provided. The communication apparatus may be the second apparatus according to any one of the first to second aspects. The communication apparatus has a function of the second apparatus. In an optional implementation, the communication apparatus includes a baseband apparatus and a radio frequency apparatus. In another optional implementation, the communication apparatus includes a processing unit (sometimes also referred to as a processing module) and a transceiver unit (sometimes also referred to as a transceiver module). For an implementation of the transceiver unit, refer to the description of the third aspect.

For example, the receiving unit is configured to receive a first signaling from a terminal device, where the first signaling is used to request to perform a service.

The sending unit is configured to send a first message to a first OTN device, where the first message is used to determine a path of the service in an OTN, and the first message includes first address information of the service.

Alternatively, the processing unit is configured to receive a first signaling from a terminal device through the transceiver unit, where the first signaling is used to request to perform a service.

The processing unit is further configured to send a first message to a first OTN device through the transceiver unit, where the first message is used to determine a path of the service in an OTN, and the first message includes first address information of the service.

In still another optional implementation, the communication apparatus includes a storage unit and a processing unit. The processing unit is configured to be coupled to the storage unit, and perform a program or instructions in the storage unit, to enable the communication apparatus to perform a function of the second apparatus.

According to a fifth aspect, a communication system is provided, and the communication system may also be referred to as a service configuration system. For example, the communication system may include the communication apparatus according to the third aspect, and may include the communication apparatus according to the fourth aspect.

According to a sixth aspect, a computer-readable storage medium is provided. The computer-readable storage medium is configured to store a computer program or instructions, and when executed, the computer program or instructions enables the method performed by the first apparatus or the second apparatus in the foregoing aspects to be implemented.

According to a seventh aspect, a computer program product including instructions is provided. When the computer program product runs on a computer, the method in the foregoing aspects is implemented.

In embodiments of this application, when a terminal device initiates a service, a first OTN device may perform corresponding processing based on determining whether a first path is established in an OTN, for example, may establish a new path or adjust a bandwidth of an existing path based on a result of the determining. This indicates that a path in an OTN may be established for a service when a terminal device initiates the service, or even if a path in an OTN is maintained for a corresponding service, the path does not need to be maintained based on a large bandwidth, but only a relatively small bandwidth instead. In this way, a waste of resources is reduced, a utilization rate of resources is improved, and network construction costs are reduced. In addition, in embodiments of this application, because a path of a service in an OTN may be established for the service when the service is initiated, or a bandwidth of an established path may be adjusted, a bandwidth may be configured for the corresponding path based on an actual requirement of the service instead of based on a peak requirement of a user. This can further reduce a waste of resources.

BRIEF DESCRIPTION OF DRAWINGS

FIG. 4 is a schematic diagram of a format of an intermediate node field according to an embodiment of this application;

FIG. 5 is a schematic diagram of a format of an ERP field according to an embodiment of this application;

DESCRIPTION OF EMBODIMENTS

Figure 1A:
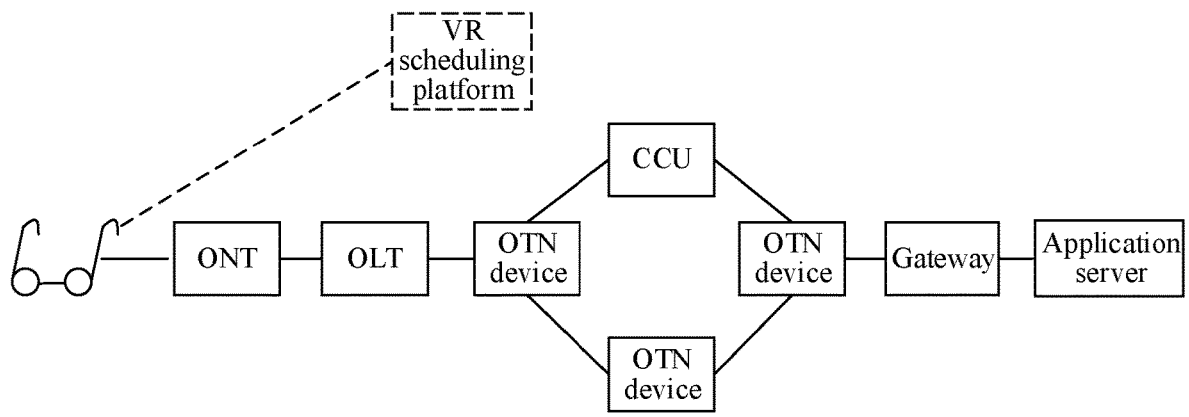
FIG. 1A is a schematic diagram of an application scenario according to an embodiment of this application.

To make objectives, technical solutions, and advantages of embodiments of this application clearer, the embodiments of this application are further described below in detail with reference to accompanying drawings.

In the following descriptions, some terms in embodiments of this application are described, to facilitate understanding of those skilled in the art.

In embodiments of this application, a terminal device is a device with a wireless transceiver function, or may be a fixed device, a mobile device, a handheld device (for example, a mobile phone), a wearable device, an in-vehicle device, or a wireless apparatus built in the foregoing devices (such as a communication module, a modem, or a chip system). The terminal device is configured to connect a person, an object, a machine, and the like, and may be widely used in various scenarios, for example, including but not limited to the following scenarios: cellular communications, device-to-device (D2D) communications, vehicle-to-everything (V2X) communications, machine-to-machine/machine-type communications (M2M/MTC), an internet of things (IoT), virtual reality (VR), augmented reality (AR), industrial control, self-driving, remote medical, a smart grid, a smart furniture, a smart office, a smart wear, smart transportation, a smart city, drones, robots and the like. The terminal device may sometimes be referred to as a user equipment (UE), a terminal, an access station, a UE station, a remote station, a wireless communication device, a user apparatus, or the like.

In embodiments of this application, unless otherwise specified, a term in "singular form" or "plural form" refers to "one or more". "At least one" refers to one or more, and "a plurality of" refers to two or more. The term "and/or" describes an association between associated objects and represents that three kinds of relationship may exist. For example, A and/or B may indicate the following three cases: Only A exists, both A and B exist, or only B exists, where A and B may be singular or plural. A character "/" generally indicates that associated objects are in an "or" relationship. For example, AB indicates: A or B. The term "at least one of . . . " or a similar expression thereof refers to any combination of these items, including any combination of singular items or plural items. For example, at least one of a, b, or c indicates: a, b, c, a and b, a and c, b and c, or a and b and c, where a, b, and c may be singular or plural.

In embodiments of this application, ordinal numbers such as "first" and "second" are used to distinguish between a plurality of objects, and are not used to limit sizes, content, sequences, time sequences, priorities, or importance levels of the plurality of objects. For example, a first message and a second message may be a same message, or may be different messages. In addition, this denotation does not indicate that the two messages are different in size, content, sending order, priority, importance level, or the like.

In emerging services such as VR games, cloud games, and ultra-HD videos, users are increasingly demanding network quality with a low delay and low jitter. An OTN can provide committed bandwidth isolation and stable delay performance, which is suitable for such services. For example, for a typical application scenario, refer to FIG. 1A. FIG. 1A includes a terminal device, an optical network terminal (ONT), an optical line terminal (OLT), a plurality of OTN devices, a central control unit (CCU), a gateway, and an application server. For the terminal device in FIG. 1A, smart glasses are used as an example, for example, VR glasses. It may be considered that a plurality of OTN devices belong to an OTN network. In other words, in FIG. 1A, an OTN network includes a plurality of OTN devices. Certainly, only some OTN devices are drawn in FIG. 1A, and some OTN devices are not drawn. Actually, the OTN network may include one or more OTN devices. A CCU is located in an OTN, and may also be considered as an OTN device. Because a function of the CCU is involved in this embodiment of this application, the CCU is drawn separately. The application server may provide a service for a corresponding application, for example, may provide a service for a video application. An example in which the application server provides a service for a VR application is used, and the application server is, for example, a VR rendering cloud (or referred to as a VR rendering server). In addition, if a scenario shown in FIG. 1A is applied to a VR service, FIG. 1A may further include a VR scheduling platform. The VR scheduling platform may be configured to manage one or more VR devices, for example, may provide an address of the VR rendering cloud for these VR devices.

An example in which the scenario shown in FIG. 1A is applied to a VR service is used. For a cloud VR service process, refer to FIG. 1B.

S11: The VR device sends a VR service request to the VR scheduling platform, and the VR scheduling platform receives the VR service request from the VR device. If the VR service is, for example, a VR game service, a VR game service request may be used to request to perform the VR service.

S12: The VR scheduling platform sends an address of the VR rendering cloud to the VR device, and the VR device receives the address of the VR rendering cloud from the VR scheduling platform. The VR rendering cloud is an application server that provides a service for the VR service.

For example, after being started, the VR device first obtains the address of the VR rendering cloud through an internet channel. The internet channel is a channel between the VR device and the VR scheduling platform. In other words, the VR device obtains the address of the VR rendering cloud from the VR scheduling platform.

S13: The VR device sends, to the ONT, a signaling for connecting to the VR rendering cloud, and the ONT receives the signaling from the VR device. The signaling is used to request to perform the VR service.

S14: The ONT performs service flow identification.

The ONT may identify a service requested by the signaling to be performed, to determine a path of the service. For example, if the service is identified as a VR service, the signaling is sent to the VR rendering cloud by the OLT device, the OTN, and the like. If the service is another service, the signaling may be sent through another path.

S15: The OLT device sends the signaling to the VR rendering cloud by a device such as the OTN or a gateway, and the VR rendering cloud receives the signaling from the gateway.

If a path corresponding to the VR service has been established in the OTN, S15 may be performed. However, if the path corresponding to the VR service has not been established in the OTN, S15 cannot be performed, and the service fails to be performed.

S16: The VR rendering cloud sends data flow of the VR service to the VR device through a device such as the gateway, the OTN, the OLT device, the ONT, and the like. The data flow of the VR service is, for example, a VR game video rendering flow.

Figure 1B:
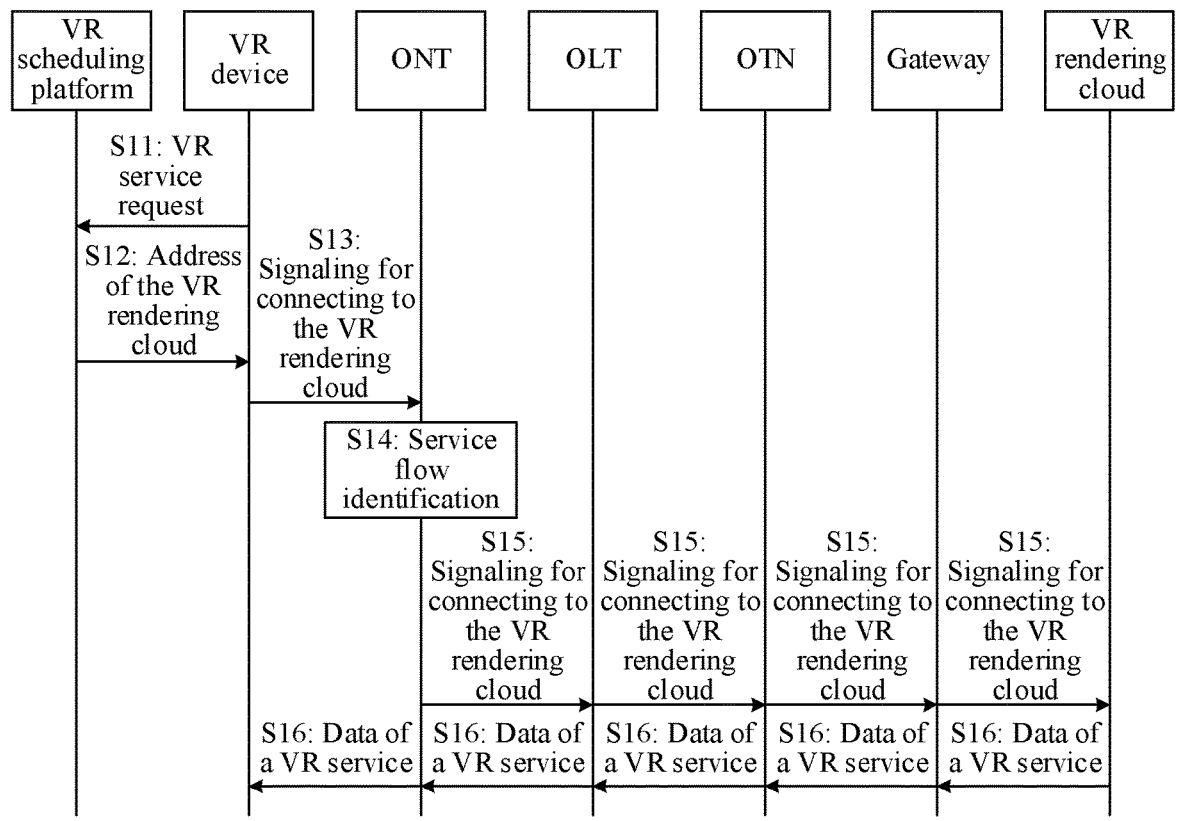
FIG. 1B is a flowchart of performing a cloud VR service.

According to the process shown in FIG. 1B, the VR device may start to perform the VR service, and a user may watch a corresponding image through the VR device.

Currently, for a UE, a path of a service of the UE in the OTN is preconfigured. In addition, because the path is preconfigured, a parameter (for example, a parameter such as bandwidth) of the path cannot be adjusted subsequently. Therefore, to ensure quality of experience of a user, a bandwidth is reserved for the path based on a peak demand of the user during initial configuration of the path. That is, currently, a bandwidth configured for a preconfigured path is relatively large. For example, the UE is a VR device, a path of a VR service performed by the VR device in the OTN is preconfigured, and a bandwidth configured for the path is a peak bandwidth of the VR service. However, the UE may not always perform the corresponding service. For example, the user may play a game for hours and then stop, that is, the user may not be always in a state of playing the game. The path that has been established for the service of the UE is not deleted. Even if the user does not use the path, the path still exists, and a resource such as a bandwidth reserved for the path cannot be occupied by another user or another service. This results in a huge waste of resources on an entire network and high network construction costs.

In view of this problem, other tunnels can be used to transmit services instead of the OTN. For example, MPLS tunnels and SR tunnels can be used. Through this type of tunnel, even if a path is preconfigured for a service, when a user does not use the service, another user or another service can also use the path. This solves the problem of a waste of resources. Through this type of tunnel, a plurality of users can share a resource, and different users can use a resource by preemption. However, this manner causes congestion. Therefore, if this type of tunnel is used, performance indicators such as a delay and jitter of a service may be poor, and services that have high requirements on these performance indicators cannot be fulfilled.

In view of this, technical solutions in embodiments of this application are provided. In embodiments of this application, a path in an OTN may be established for a service when a terminal device initiates the service. In other words, there is no need to maintain the path for the service in the OTN continuously, thereby reducing a waste of resources, improving a utilization rate of resources, and reducing network construction costs. Alternatively, a bandwidth of an established path may be adjusted when a terminal device initiates a service. In this case, even if a path of the service in an OTN is maintained, the path may be maintained based on a relatively small bandwidth, and the bandwidth may be adjusted only when the path needs to be used. In this way, a waste of resources can be reduced. In addition, in embodiments of this application, because a path of a service in an OTN may be established for the service when the service is initiated, or a bandwidth of an established path may be adjusted, a bandwidth may be configured for the corresponding path based on an actual requirement of the service instead of based on a peak requirement of a user. This can further reduce a waste of resources.

Figure 2:
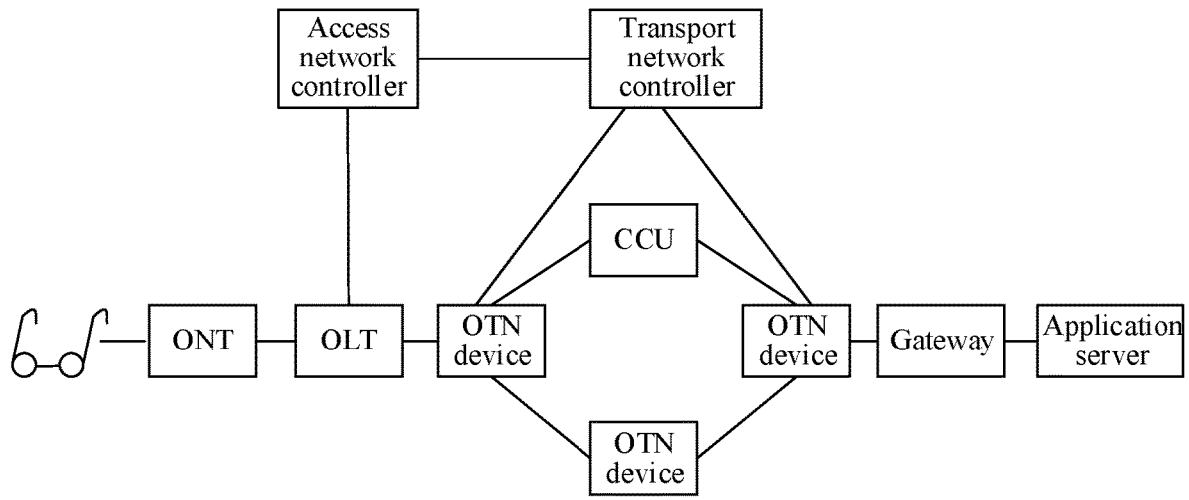
FIG. 2 is a schematic diagram of another application scenario according to an embodiment of this application.

The technical solutions provided in embodiments of this application may be applied to an OTN, or may be applied to another similar network. For example, FIG. 1A may be an application scenario according to an embodiment of this application. In addition, FIG. 2 is another application scenario according to an embodiment of this application. FIG. 2 includes a terminal device, an ONT, an OLT device, a plurality of OTN devices, a CCU, a gateway, an application server, an access network controller, and a transport network controller. The access network controller may be provided by a communication operator, may be located in an access network device as a functional module in the access network device, may not be located in the access network device but in another device as a functional module in the another device, or may be an independent device. The access network controller may perform overall management on one or more OLT devices. The transport network controller may perform management on the OTN. The transport network controller may be provided by a communication operator, may be located in an access network device as a functional module in the access network device, may not be located in the access network device but in another device as a functional module in the another device, or may be an independent device. In FIG. 2, the transport network controller may communicate with an ingress OTN device and an egress OTN device of the OTN. This is merely an example. Actually, the transport network controller may communicate with all or some OTN devices included in the OTN. For descriptions of other devices included in FIG. 2, refer to the foregoing descriptions of FIG. 1A.

The method provided in embodiments of this application is described below with reference to the accompanying drawings. The embodiments of this application may be applied to the scenario shown in FIG. 1A or the scenario shown in FIG. 2. In the following description, an example in which the technical solutions provided in embodiments of this application are applied to the scenario shown in FIG. 1A is mainly used. If the technical solutions provided in embodiments of this application are applied to the scenario shown in FIG. 2, the following steps performed by a first OTN device may change to be performed by the access network controller, and the following steps performed by the CCU may change to be performed by the transport network controller. It should be noted that both FIG. 1A and FIG. 2 include a plurality of OTN devices, and a first OTN device mentioned in each embodiment of this application may be the leftmost OTN device in FIG. 1A or FIG. 2. Alternatively, the first OTN device mentioned in embodiments of this application is an ingress OTN device that enters an OTN from a user side. In addition, in the accompanying drawings (for example, FIG. 3 or FIG. 6A and FIG. 6B) corresponding to the embodiments of this application, all steps represented by dotted lines are optional steps.

Figure 3:
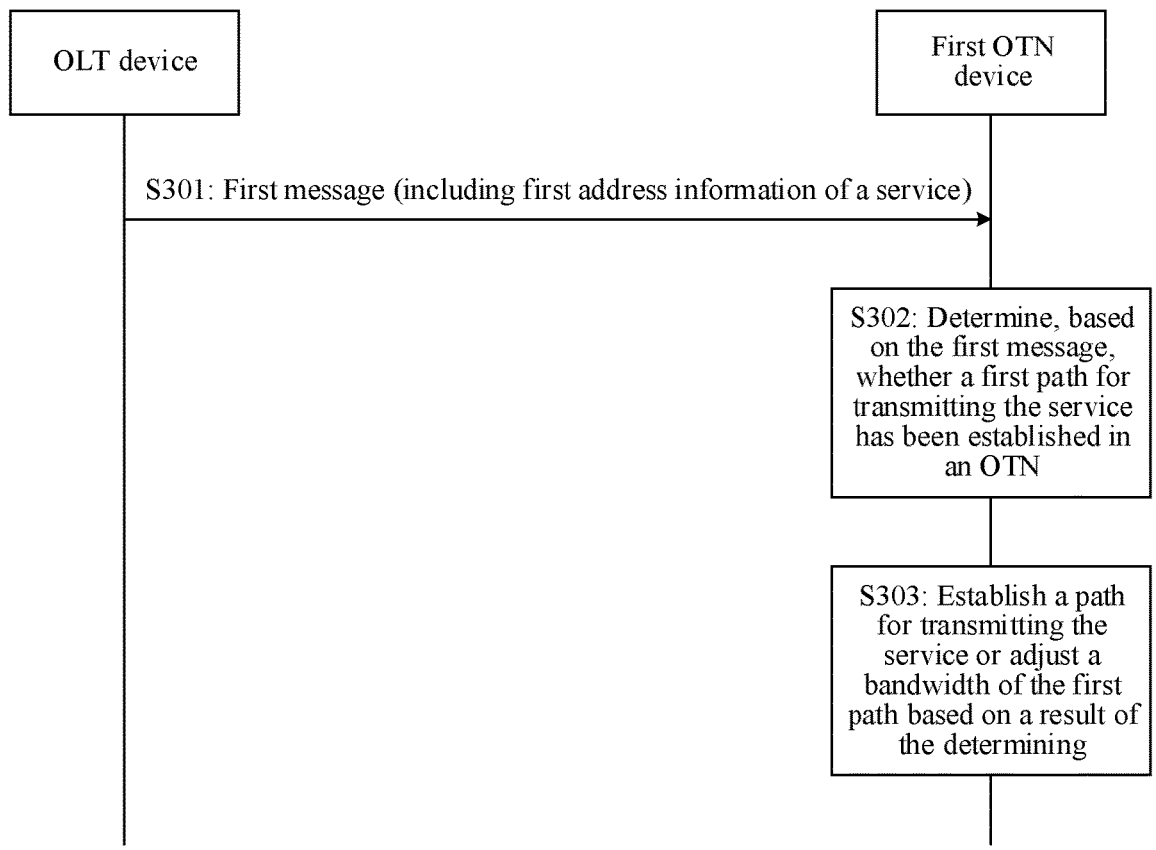
FIG. 3 is a flowchart of a service configuration method according to an embodiment of this application.

FIG. 3 is a service configuration method according to an embodiment of this application.

S301: An OLT device sends a first message to a first OTN device, and correspondingly, the first OTN device receives the first message from the OLT device. This uses an example in which the technical solutions in embodiments of this application are applied to the scenario shown in FIG. 1A. If the technical solutions in embodiments of this application are applied to the scenario shown in FIG. 2, S301 may be replaced with: An OLT device sends a first message to an access network controller, and correspondingly, the access network controller receives the first message from the OLT device. Therefore, all processes that are performed by the first OTN device and that are described in subsequent steps may be performed by the access network controller.

The first message may include first address information of a service, and the first address information includes address information that needs to be satisfied by a path of the service in the OTN. That is, the OLT device notifies the first OTN device that a path for transmitting the service needs to satisfy the first address information. That a path satisfies the first address information may be understood as that the path is determined based on the first address information. In other words, a path may be determined based on the first address information, and the path is a path that satisfies the first address information. The first address information may include one or more of the following: a source internet protocol (IP) address of the service, a destination IP address of the service, an egress address of the service on the first OTN device, and a next-hop address of the service after the service passes through the OTN. For example, the first address information includes a source IP address of the service and a destination IP address of the service. Alternatively, the first address information includes an egress address of the service on the first OTN device and a next-hop address of the service after the service passes through the OTN. Alternatively, the first address information includes a destination IP address of the service. Alternatively, the first address information includes a next-hop address of the service after the service passes through the OTN. Alternatively, the first address information includes a source IP address of the service, a destination IP address of the service, an egress address of the service on the first OTN device, a next-hop address of the service after the service passes through the OTN, and the like.

The source IP address of the service is, for example, an IP address of a terminal device that requests the service. The destination IP address of the service is, for example, an IP address of an application server that provides the service. For example, the service is a VR service, the destination IP address of the VR service may be an IP address of a VR rendering cloud that provides the VR service, and the destination IP address of the service may be obtained from a first signaling. The egress address of the service on the first OTN device is, for example, an address on the first OTN device of an interface that is used to send the service. The next-hop address of the service after the service passes through the OTN is, for example, an IP address of a next-hop device after the service passes through the OTN. For example, the service arrives at a gateway after passing through the OTN. In this case, the IP address of the next-hop device after the service passes through the OTN is an IP address of the gateway. The egress address of the service on the first OTN device and the next-hop address of the service after the service passes through the OTN may also be obtained from the first signaling, or may also be determined by the OLT device.

Because a PCEP session has been established between the first OTN device and the OLT device, for example, the first message is a PCEP message, for example, a PCEP request message, or the first message may be another message. Optionally, in this embodiment of this application, a first field may be added to the PCEP request message, that is, a first field is added based on a message format specified in an existing PCEP protocol. The first field may be used to carry the egress address of the service on the first OTN device and the next-hop address of the service after the service passes through the OTN. The first field is referred to, for example, as a MIDDLE-POINTS field, or may be of another name. Alternatively, an existing field in the PCEP request message may be used to carry the egress address of the service on the first OTN device and the next-hop address of the service after the service passes through the OTN. FIG. 4 is an example of a format of a MIDDLE-POINTS object. In FIG. 4, Object-Class refers to a type of a MIDDLE-POINTS object, for example, may be 44, or may be of another value. OT represents Object-Type. For example, the OT being of a value "1" represents updating a path, while the OT being of a value "2" represents deleting a path. RES represents a reserved bit, for example, may have a fixed value of 0. A P flag indicates that the MIDDLE-POINTS field is an optional field or a mandatory field. In this embodiment of this application, the P flag may be set to 1, indicating that the MIDDLE-POINTS field is a mandatory field. Because the P flag is set to 1, an I flag needs to be set to 0, indicating that the MIDDLE-POINTS field cannot be ignored. Object Length may indicate a length of information carried in the MIDDLE-POINTS field. For example, if a length of the egress address of the service on the first OTN device and the next-hop address of the service after the service passes through the OTN is 8, the Object Length may be set to 8. Out Interface IP may fill in the egress address of the service on the first OTN device, and Next Hop IP may fill in the next hop address of the service after the service passes through the OTN.

The source IP address of the service and the destination IP address of the service may be carried by a second field in the PCEP request message. The second field may be a new field added based on a message format specified in an existing PCEP protocol, or may be an existing field in the PCEP request message. For example, in this embodiment of this application, an existing END-POINTS field in the PCEP request message is used as the second field, and the END-POINTS field is used to carry an IP address of an ingress OTN device and an IP address of an egress OTN device in the OTN. In addition, in this embodiment of this application, the END-POINTS field is used to carry an IP address of a terminal device that requests the service and an IP address of an application server that provides the service, so that the terminal device and the application server are visible to the OTN device. This is beneficial for the OTN to establish or maintain a corresponding path for the terminal device.

In addition to the first address information, the first message may optionally further indicate to update a path or delete a path. For example, the first message is a PCEP request message, the PCEP request message includes a third field, and the third field may indicate to update a path or delete a path. For example, if a terminal device requests a service, the third field may indicate to update a path. Updating a path may include establishing a new path, or may include adjusting a bandwidth of an existing path, and the like. If a terminal device goes offline or requests to delete a path, the third field may indicate to delete the path. The third field included in the first message in S301 indicates to update a path.

The third field may be a new field added based on a message format specified in an existing PCEP protocol, or may be an existing field in the PCEP request message. An example in which the third field is a newly added field is used. For example, the third field is referred to as an ERP field, or may be of another name. FIG. 5 is an example of a format of an ERP object. In FIG. 5, Object-Class refers to a type of an ERP object, for example, may be 43, or may be of another value. OT represents Object-Type. For example, the OT being of a value "1" represents updating a path, while the OT being of a value "2" represents deleting a path. RES represents a reserved bit, for example, may have a fixed value of 0. A P flag indicates that the ERP field is an optional field or a mandatory field. In this embodiment of this application, the P flag may be set to 1, indicating that the ERP field is a mandatory field. Because the P flag is set to 1, an I flag needs to be set to 0, indicating that the ERP field cannot be ignored. Because the ERP object has indicated to update a path or delete a path through the OT, and there is no further object body, the Object Length can be set to 0, indicating that there is no object body.

Optionally, in addition to the first address information, the first message may further include bandwidth requirement information, or include delay requirement information, or include bandwidth requirement information and delay requirement information. Both the bandwidth requirement information and the delay requirement information are information that needs to be satisfied by a path for transmitting the service. For example, the bandwidth requirement information may indicate a bandwidth that needs to be satisfied by the path for transmitting the service, and the delay requirement information may indicate a delay that needs to be satisfied by the path for transmitting the service. Certainly, in addition to the above information, the first message may further include other information satisfied for transmitting the path of the service.

The first field, the second field, the third field, the bandwidth requirement information, the delay requirement information, and the like may all be included in a message header of the first message. For example, the first message is a PCEP request message, and the first message includes the first field, the second field, the third field, the bandwidth requirement information, and the delay requirement information. An example of a message header of the PCEP request message provided in this embodiment of this application is as follows:

<PCReq Message>::=<Message Common Header>
        <ERP>: indicate to establish/delete a connection
        <RP>: carry a Request-ID-number
        <END-POINTS>: carry a source/destination IP
        <MIDDLE-POINTS>: carry an egress IP and a next hop IP
        [<BANDWIDTH>]: carry bandwidth requirement information
        [<DELAY>]: carry delay requirement information.

In this example, an example in which a BANDWIDTH field carries the bandwidth requirement information and a DELAY field carries the delay requirement information is used. In addition, an RP field is an original field in the PCEP request message, and may be used to carry a Request-ID-number, and the Request-ID-number may indicate a sequence number of the PCEP request message.

S302: The first OTN device determines, based on the first message, whether a path for transmitting the service has been established in an OTN. In this embodiment of this application, a path for transmitting a service in an OTN may also be referred to as a pipe for transmitting a service, or referred to as a channel for transmitting a service, or the like.

If the first message includes some requirements (for example, first address information) that need to be satisfied by a path for transmitting a service in an OTN, the first OTN device may determine whether there is a path in the OTN that satisfies the requirements of the first message. Specifically, if there is one path in the OTN that can satisfy the requirements of the first message, the first OTN device determines that a path for transmitting the service has been established in the OTN. If there is no path in the OTN that can satisfy the requirements of the first message, the first OTN device determines that no path for transmitting the service is established in the OTN.

For example, the first OTN device may obtain second address information based on the first address information, where the second address information is address information in the OTN. The process may be understood as follows: The first OTN device maps the first address information to the address information in the OTN. The first OTN device may determine, based on the second address information, whether the path for transmitting the service has been established in the OTN.

For example, the second address information includes a source device (or referred to as a source node) identifier, a destination device (or referred to as a destination node) identifier, and a slot number of the first path in the OTN. The source device identifier is, for example, an identity (ID) of a source device. The destination device identifier is, for example, an ID of a destination device. A source device of the first path in the OTN is, for example, an ingress OTN device through which the first path enters the OTN, and a destination device of the first path in the OTN is, for example, an egress OTN device through which the first path leaves the OTN. For example, the slot number includes an ingress slot number (or referred to as an ingress slot channel number) corresponding to the source device, and includes an egress slot number (or referred to as an egress slot channel number) corresponding to the destination device. The ingress slot number and the egress slot number may be used as a number of the first path. It may be understood that the second address information indicates a source device, a destination device, and a number of the first path in the OTN. Therefore, whether the first path exists in the OTN network may be determined based on the second address information. If the first path already exists, it is considered that a path that can transmit the service has been established. If the first path does not exist, it is considered that no path that can transmit the service has been established. The first path is a path that can satisfy the first address information, and is also a path that can satisfy the second address information. That the first path satisfies the first address information (or the second address information) may also be referred to as that the first path corresponds to the first address information (or the second address information), or the like. This may be understood as that a path determined based on the first address information (or the second address information) is the first path. In other words, the first path is determined based on the first address information (or the second address information). In other words, a path may be determined in the OTN based on the first address information (or the second address information), and the path is the first path.

S303: The first OTN device establishes a path for transmitting the service or adjusts a bandwidth of the established first path based on a result of the determining.

If the first path does not exist, the first OTN device may establish a new path in the OTN to transmit the service. If the first path already exists, the first OTN device may adjust a bandwidth of the first path accordingly. How the first OTN device establishes the new path and how to adjust the bandwidth of the first path will be described in a next embodiment. Therefore, details are not described herein.

In embodiments of this application, when a terminal device initiates a service, a first OTN device may perform corresponding processing based on determining whether a first path is established in an OTN, for example, may establish a new path or adjust a bandwidth of an existing path based on a result of the determining. This indicates that a path in an OTN may be established for a service when a terminal device initiates the service, or even if a path in an OTN is maintained for a corresponding service, the path does not need to be maintained based on a large bandwidth, but only a relatively small bandwidth instead. In this way, a waste of resources is reduced, a utilization rate of resources is improved, and network construction costs are reduced. In addition, in embodiments of this application, because a path of a service in an OTN may be established for the service when the service is initiated, or a bandwidth of an established path may be adjusted, a bandwidth may be configured for the corresponding path based on an actual requirement of the service instead of based on a peak requirement of a user. This can further reduce a waste of resources.

Figure 6A:
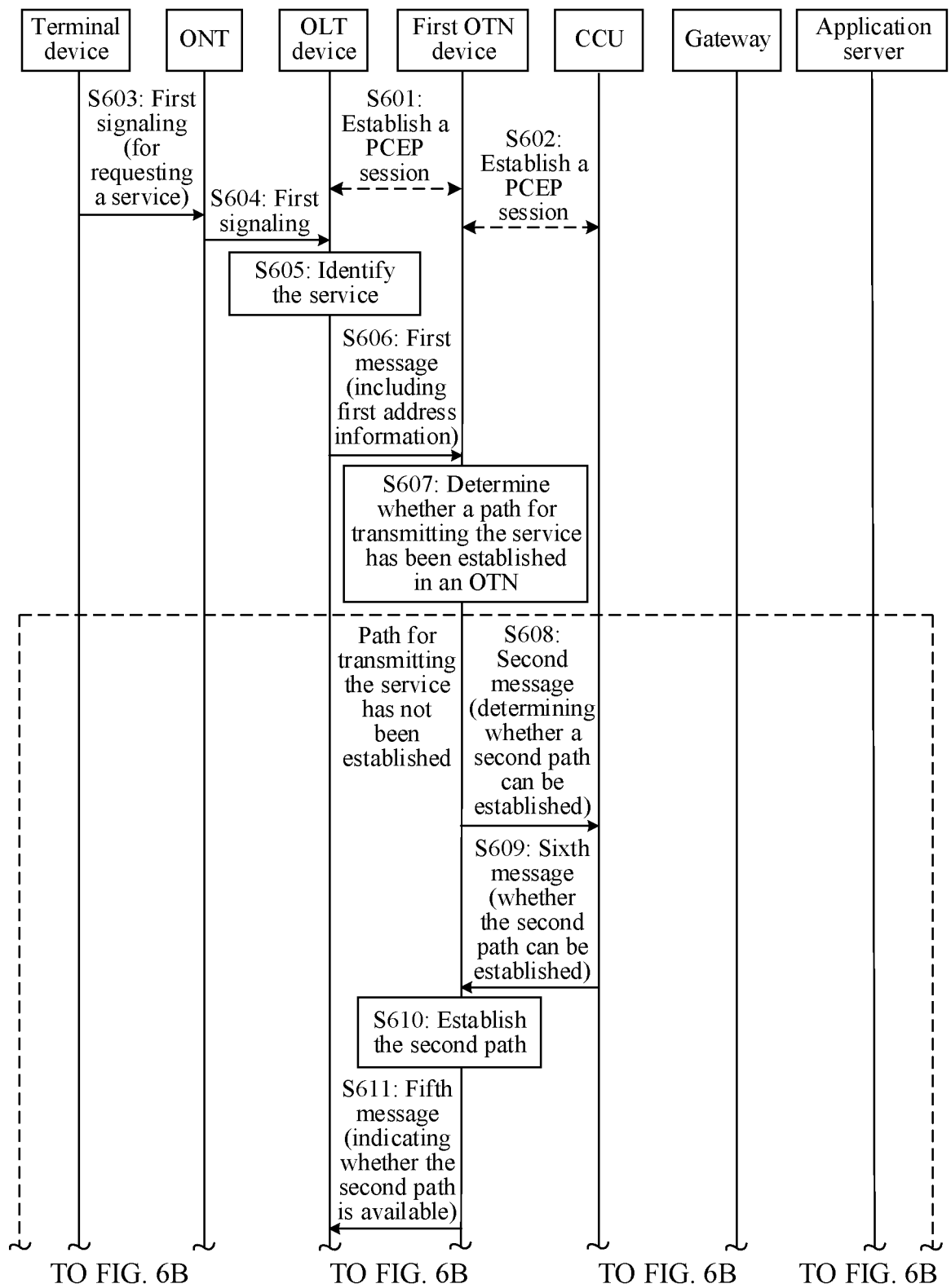
FIG. 6A and FIG. 6B are a flowchart of another service configuration method according to an embodiment of this application.
Figure 6B:
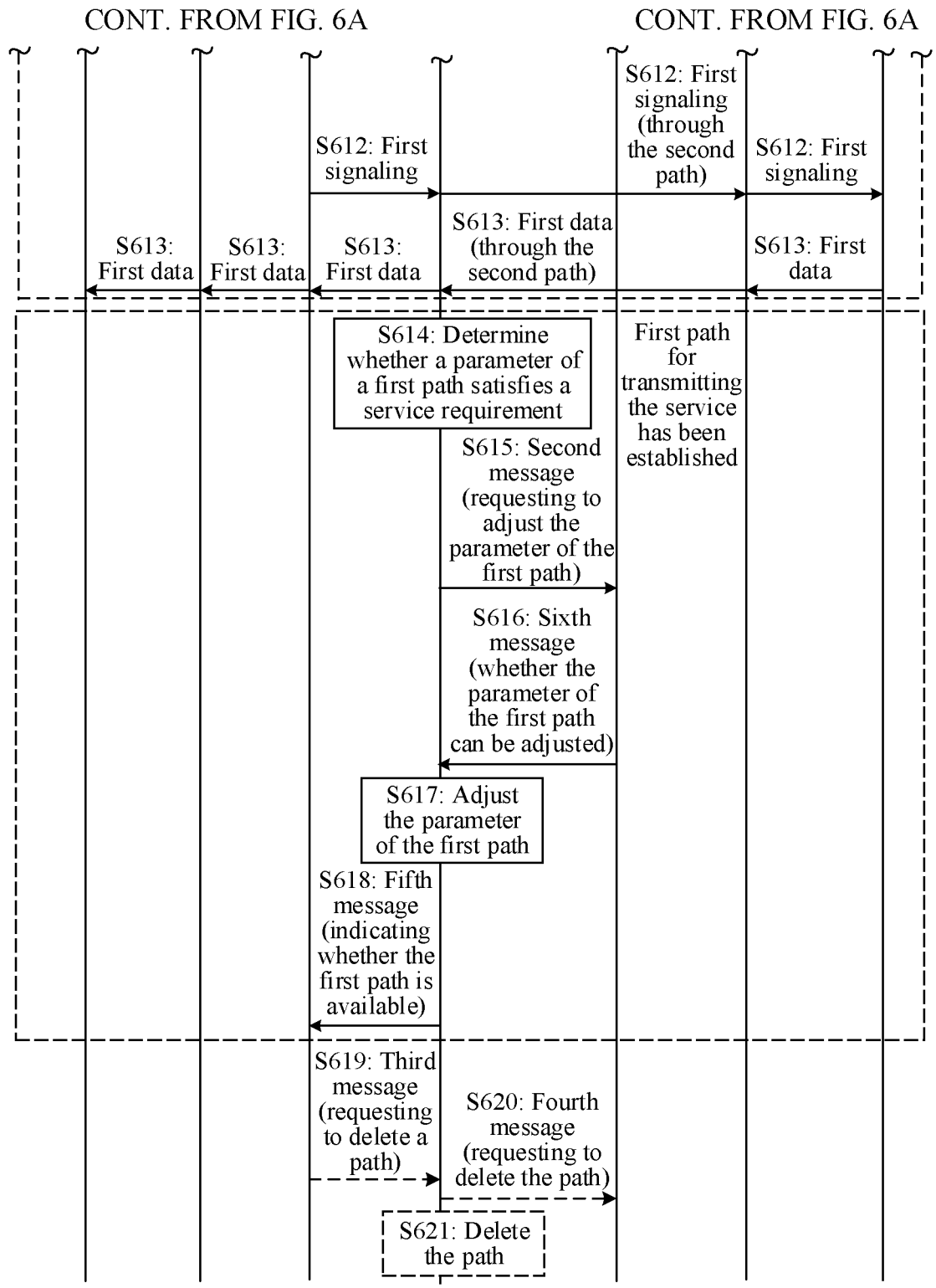

FIG. 6A and FIG. 6B are another service configuration method according to an embodiment of this application. The method shown in FIG. 6A and FIG. 6B may be considered as a detailed description of the method shown in FIG. 3, or the method shown in FIG. 6A and FIG. 6B may be considered as an implementation of the method shown in FIG. 3.

S601: Establish a path computation element communication protocol (PCEP) session between an OLT device and a first OTN device. For example, the PCEP session is a session based on a user network interface (UNI). For example, S601 may be implemented as follows: A UNI-PCE in the first OTN device establishes a PCEP session with an NNI-PCC in the OLT device.

Because the technical solutions provided in this embodiment of this application relate to a process of determining a path of a service in an OTN or a process of path computation, two functional units are involved: a path computation client (PCC) and a path computation element (PCE), where the PCC may be considered as a client, and the PCE may be considered as a server of the client. For example, a PCC (for example, referred to as a UNI-PCC) is disposed in the OLT device, and a corresponding PCE (for example, referred to as a UNI-PCE) is disposed in the first OTN device. Therefore, the OLT device may be considered as a client, and the OTN device may be considered as a server. In this embodiment of this application, information exchange between the OLT device and the first OTN device may be implemented by the UNI-PCC in the OLT device and the UNI-PCE in the first OTN device.

S602: The first OTN device establishes a PCEP session with a CCU. For example, the PCEP session is a session based on a network node interface (NNI). For example, S602 may be implemented as follows: An NNI-PCC in the first OTN device establishes a PCEP session with an NNI-PCE in the CCU.

For example, a PCC (for example, referred to as an NNI-PCC) is disposed in the first OTN device, and a PCE (for example, referred to as an NNI-PCE) is disposed in the CCU. Therefore, the first OTN device may be considered as a client, and the CCU may be considered as a server. In this embodiment of this application, information exchange between the CCU and the first OTN device may be implemented by the NNI-PCE in the CCU and the NNI-PCC in the first OTN device.

When deploying the OTN, the PCEP sessions may be established between the OLT device and the first OTN device, and between the first OTN device and the CCU. S601 may occur before S602, or S601 may occur after S602, or S601 and S602 may occur simultaneously.

S603: A terminal device sends a first signaling to an ONT, and correspondingly, the ONT receives the first signaling from the terminal device. The first signaling is used to request a service, or the first signaling is used to request to configure a service. For example, if the first signaling is used to request to connect to an application server of the service, it is considered that the first signaling is used to request to configure the service.

In this embodiment of this application, the service is, for example, a video service, an audio service, or another data service. The service type or the like is not limited. For example, when the terminal device needs to request the service (for example, the terminal device goes online, or the user invokes an application installed on the terminal device and the application corresponds to the service), the terminal device may send the first signaling to the ONT.

S604: The ONT sends the first signaling to the OLT device, and correspondingly, the OLT device receives the first signaling from the ONT.

S605: The OLT device identifies the service.

The OLT device may identify a service requested by the first signaling, to determine how the service should be transmitted. For example, if it is determined that the service is a high-quality service, or the service is a service that has a relatively high requirement on transmission quality, the service may be transmitted through the OTN, and the OLT device may send the first signaling to the application server of the service through the OTN. However, if it is determined that the service is a service other than the high-quality service, the service may be transmitted through another device instead of the OTN, and the OLT device may send the signaling through another path.

For example, the high-quality service includes a video service, for example, a VR service. In addition, the high-quality service may further include another service. Which service is a high-quality service may be preconfigured in the OLT device.

S606: The OLT device sends a first message to the first OTN device, and correspondingly, the first OTN device receives the first message from the OLT device. For example, S606 may be implemented as follows: The UNI-PCC in the OLT device sends the first message to the UNI-PCE in the first OTN device. For example, if the service in this embodiment of this application is a high-quality service, the OLT device sends the first message to the first OTN device.

For example, the first message may include the first address information. A source IP address of the service included in the first address information is, for example, an IP address of a terminal device that requests the service, that is, an IP address of the terminal device described in S603. The IP address of the terminal device may be obtained from the first signaling. The destination IP address of the service is, for example, an IP address of an application server that provides the service. For example, the service is a VR service, the destination IP address of the VR service may be an IP address of a VR rendering cloud that provides the VR service, and the destination IP address of the service may be obtained from a first signaling. The egress address of the service on the first OTN device is, for example, an address on the first OTN device of an interface that is used to send the service. The next-hop address of the service after the service passes through the OTN is, for example, an IP address of a next-hop device after the service passes through the OTN. For example, the service arrives at a gateway after passing through the OTN. In this case, the IP address of the next-hop device after the service passes through the OTN is an IP address of the gateway. The egress address of the service on the first OTN device and the next-hop address of the service after the service passes through the OTN may also be obtained from the first signaling, or may also be determined by the OLT device. In addition, bandwidth requirement information and/or delay requirement information and the like included in the first message may also be obtained from the first signaling.

For more details of S606, refer to the description of S301 in the embodiment shown in FIG. 3.

S607: The first OTN device determines, based on the first message, whether a path for transmitting the service has been established in an OTN. In this embodiment of this application, a path for transmitting a service in an OTN may also be referred to as a pipe for transmitting a service, or referred to as a channel for transmitting a service, or the like.

For more details of S607, refer to the description of S302 in the embodiment shown in FIG. 3. That the first OTN device obtains second address information based on the first address information may be, for example, implemented as follows: The UNI-PCE in the first OTN device parses the first address information, maps the first address information to the second address information, and sends the second address information to the NNI-PCC in the first OTN device.

Based on the description of S303 in the embodiment shown in FIG. 3, if the first path does not exist, the first OTN device may establish a new path in the OTN to transmit the service. If the first path already exists, the first OTN device may adjust a bandwidth of the first path. The two processes are described separately below. S608 to S613 describe a process in which the first OTN device establishes a path, and S613 to S618 describe a process in which the first OTN device adjusts a bandwidth of the first path. The two processes do not occur both. Instead, one of these processes occurs depending on whether the first path exists or not.

S608: The first OTN device sends a second message to the CCU, and correspondingly, the CCU receives the second message from the first OTN device. Because a PCEP session has been established between the first OTN device and the CCU, for example, the second message is a PCEP message, for example, a PCEP request message, or may be another message. In S609, the second message may be used to request to establish a second path, or the second message may be used to determine whether the second path can be established, or the second message is used to determine whether the second path is available. For example, S608 may be implemented as follows: The NNI-PCC in the first OTN device sends the second message to the NNI-PCE in the CCU.

This uses an example in which the technical solutions in embodiments of this application are applied to the scenario shown in FIG. 1A. If the technical solutions in embodiments of this application are applied to the scenario shown in FIG. 2, S608 may be replaced with: An access network controller sends a second message to a transport network controller, and correspondingly, the transport network controller receives the second message from the access network controller. Therefore, all processes that are performed by the first OTN device and that are described in subsequent steps may be performed by the access network controller, and all processes that are performed by the CCU and that are described in subsequent steps may be performed by the transport network controller.

The second message may include second address information, and the second address information is address information that needs to be satisfied by a second path that is requested by the second message to be established. That the second path satisfies the second address information may also be referred to as that the second path corresponds to the second address information, or the like. This may be understood as that a path determined based on the second address information is the second path. In other words, the second path is determined based on the second address information. In other words, a path may be determined in the OTN based on the second address information, and the path is the second path. Optionally, the second message may further include bandwidth requirement information and/or delay requirement information, and the like. All the information is obtained from the first message, and the information is also information that needs to be satisfied by a second path that is requested by the second message to be established. If the second message is a PCEP request message, for a format of the second message, refer to the format of the first message described above.

That is, the first OTN device can determine the first path based on the first message. If the first path has not been established in an OTN, the first OTN device may establish a new path to transmit the service. For example, the newly established path is referred to as a second path. However, the first OTN device cannot determine whether the OTN can support the second path. For example, the first OTN device cannot determine whether the OTN can support a parameter such as a bandwidth of the second path. Therefore, the first OTN device needs to send the second message to the CCU to inquire whether the second path can be established.

S609: The CCU sends a sixth message to the first OTN device, and correspondingly, the first OTN device receives the sixth message from the CCU. For example, S609 may be implemented as follows: The NNI-PCE in the CCU sends the sixth message to the NNI-PCC in the first OTN device.

If the second message is used to request to establish the second path, or the second message is used to determine whether the second path can be established, the sixth message may be used to indicate that the second path can be established, or indicate that the second path cannot be established. Alternatively, if the second message is used to determine whether the second path is available, the sixth message may be used to indicate whether the second path is available or unavailable. If the sixth message indicates that the second path cannot be established or indicates that the second path is unavailable, optionally, the sixth message may further indicate a reason why the second path cannot be established or the second path is unavailable. For example, the reason is that the OTN does not support a bandwidth required by the second path, the OTN does not support a delay required by the second path, or the like.

If the sixth message indicates that the second path can be established or indicates that the second path is available, perform S610. If the sixth message indicates that the second path cannot be established or indicates that the second path is unavailable, perform S611.

S610: The first OTN device establishes the second path.

If the sixth message indicates that the second path can be established or indicates that the second path is available, the first OTN device may establish the second path in the OTN.

If the technical solutions provided in embodiments of this application are applied to the scenario shown in FIG. 2, after S610 is performed (S610 needs to be replaced with: The transport network controller sends the sixth message to the access network controller, and correspondingly, the access network controller receives the sixth message from the transport network controller), the transport network controller may send first indication information to the first OTN device, where the first indication information may indicate to establish the second path. For example, the first indication information may include the second address information, and may further include other information in the first message, for example, the bandwidth requirement information and/or the delay requirement information. After receiving the first indication information, the first OTN device may perform S610.

S611: The first OTN device sends a fifth message to the OLT device, and correspondingly, the OLT device receives the fifth message from the first OTN device. For example, the fifth message may also be a PCEP message. For example, the first message is a PCEP request message. In this case, the fifth message may be considered as a PCEP reply message of the PCEP request message. For example, S611 may be implemented as follows: The UNI-PCE in the first OTN device sends the fifth message to the UNI-PCC in the OLT device.

If the sixth message indicates that the second path can be established or indicates that the second path is available, the fifth message indicates that the second path is available. If the sixth message indicates that the second path cannot be established or indicates that the second path is unavailable, the fifth message indicates that the second path is unavailable. To perform S610, S611 may occur after S610, may occur before S610, or may occur at the same time as S610.

For example, the fifth message may include the third field. For description of the third field, refer to the foregoing description. An example in which the fifth message is a PECP reply message and the fifth message includes the third field is used. An example of the PECP reply message is as follows:

<PCRep Message>::=<Message Common Header>
        <ERP>: indicate to establish/delete a connection
        <RP>: sequence number of an echo request
        [<NO-PATH>]: used when processing fails.

The ERP field may be used as the third field. For a format of the ERP object, refer to the foregoing description. The NO-PATH field may be used when indicating that the second path is unavailable.

If the fifth message indicates that the second path is unavailable, the OLT device may further forward the fifth message to the terminal device through the ONT. After receiving the fifth message, the terminal device may learn that the service cannot be performed by the OTN, and the terminal device may take a corresponding measure, for example, may suspend performing the service or change a path. Alternatively, if the fifth message indicates that the second path can be established or indicates that the second path is available, the OLT device may forward the fifth message to the terminal device through the ONT. After receiving the fifth message, the terminal device may normally perform the service. Alternatively, if the fifth message indicates that the second path can be established or indicates that the second path is available, the application server subsequently sends data (for example, first data) of the service to the terminal device. Therefore, the OLT device may not need to forward the fifth message to the terminal device. After receiving the data of the service from the application server, the terminal device can determine that the second path is available.

Alternatively, if the technical solutions provided in embodiments of this application are applied to the scenario shown in FIG. 2, when the sixth message indicates that the second path cannot be established or indicates that the second path is unavailable, the transport network controller may send the sixth message to the first OTN device, as well as to all or some OTN devices except the first OTN device in the OTN. In addition, after receiving the fifth message, the OLT device may forward the fifth message to the terminal device through the ONT. After receiving the fifth message, the terminal device may learn that the service cannot be performed by the OTN, and the terminal device may take a corresponding measure, for example, may suspend performing the service or change a path. Alternatively, if the fifth message indicates that the second path can be established or indicates that the second path is available, the OLT device may forward the fifth message to the terminal device through the ONT. After receiving the fifth message, the terminal device may normally perform the service. Alternatively, if the fifth message indicates that the second path can be established or indicates that the second path is available, the application server subsequently sends data (for example, first data) of the service to the terminal device. Therefore, the OLT device may not need to send the fifth message to the terminal device. After receiving the data of the service from the application server, the terminal device can determine that the second path is available.

S612: The OLT device forwards the first signaling through the second path. For example, based on the scenario shown in FIG. 1A, the OLT device sends the first signaling to the first OTN device, the first OTN device sends the first signaling to a gateway through the second path, and the gateway forwards the first signaling to the application server that provides the service. S612 is also used as an example.

S613: The application server sends the first data to the terminal device through the second path, and correspondingly, the terminal device receives the first data from the application server through the second path. For example, based on the scenario shown in FIG. 1A, a process of S613 is as follows: The application server sends the first data to the gateway, and the gateway receives the first data from the application server. The gateway sends the first data to the first OTN device through the second path, and the first OTN device receives the first data from the gateway through the second path. The first OTN device sends the first data to the OLT device, and the OLT device receives the first data from the first OTN device. The OLT device sends the first data to the ONT, and the ONT receives the first data from the OLT device. The ONT sends the first data to the terminal device, and the terminal device receives the first data from the ONT.

The first data is the data of the service. That is, the application server receives the first signaling from the terminal device, and the first signaling is used to request the service. In this case, the application server may provide the data of the service to the terminal device, to enable the terminal device to perform the service.

S614: The first OTN device determines whether a parameter of the first path satisfies a parameter requirement of the service.

Starting from S614, a case in which the first path already exists is described. In addition to the first address information, the first message may further include some other information (or referred to as a parameter) that needs to be satisfied by the path for transmitting the service, for example, the bandwidth requirement information (or referred to as a bandwidth requirement parameter) and/or the delay requirement information (or referred to as a delay requirement parameter), and the like. Therefore, the first OTN device further needs to determine whether the established first path can satisfy various parameter requirements of the first message. For example, if the first message further includes the bandwidth requirement information, the first OTN device may determine whether a bandwidth of the first path can satisfy the bandwidth requirement information. For another example, if the first message further includes the delay requirement information, the first OTN device may determine whether a delay indicator of the first path can satisfy the delay requirement information.

If the parameter of the first path does not satisfy the parameter requirement of the service (in other words, the parameter requirement included in the first message is not satisfied), S615 to S617 may be performed. If the parameter of the first path can satisfy the parameter requirement of the service (in other words, the parameter requirement included in the first message can be satisfied), S618 may be performed with S615 to S617 skipped. Therefore, S615 to S617 are optional steps. For example, S615 to S617 may be performed as long as one parameter of the first path does not satisfy the parameter requirement of the service, and S615 to S617 may not be performed if each parameter of the first path can satisfy the parameter requirement of the service.

S615: The first OTN device sends a second message to the CCU, and correspondingly, the CCU receives the second message from the first OTN device. Because a PCEP session has been established between the first OTN device and the CCU, for example, the second message is a PCEP message, for example, a PCEP request message, or may be another message. In S615, the second message may be used to request to adjust the parameter of the first path. For example, S615 may be implemented as follows: The NNI-PCC in the first OTN device sends the second message to the NNI-PCE in the CCU.

This uses an example in which the technical solutions in embodiments of this application are applied to the scenario shown in FIG. 1A. If the technical solutions in embodiments of this application are applied to the scenario shown in FIG. 2, S615 may be replaced with: An access network controller sends a second message to a transport network controller, and correspondingly, the transport network controller receives the second message from the access network controller. Therefore, all processes that are performed by the first OTN device and that are described in subsequent steps may be performed by the access network controller, and all processes that are performed by the CCU and that are described in subsequent steps may be performed by the transport network controller.

The second message may include second address information, and the second address information is address information that needs to be satisfied by the first path that is requested by the second message to be adjusted. It may be understood as that the second message indicates, through the second address information, that the first path needs to be adjusted. In addition, the second message may further include information to be adjusted. For example, if the first OTN device determines, in S614, that a bandwidth of the first path cannot satisfy a bandwidth indicated by the bandwidth requirement information, the second message may include the bandwidth requirement information. For another example, if the first OTN device determines, in S614, that a delay of the first path cannot satisfy a delay indicated by the delay requirement information, the second message may include the delay requirement information, and so on.

If the second message is a PCEP request message, for a format of the second message, refer to the format of the first message described above.

That is, the first OTN device determines that the existing first path does not satisfy a current requirement of the service, and the first OTN device can also determine what the current requirement of the service exactly is. However, the first OTN device cannot determine whether the parameter of the first path can be adjusted based on the current requirement of the service. In other words, the first OTN device cannot determine whether the OTN can support adjusting the parameter of the first path based on the current requirement of the service, for example, cannot determine whether the OTN can support a parameter after the adjusting. Therefore, the first OTN device needs to send the second message to the CCU, to inquire whether the parameter of the first path can be adjusted.

S616: The CCU sends a sixth message to the first OTN device, and correspondingly, the first OTN device receives the sixth message from the CCU. The sixth message may be used to indicate that the parameter of the first path can be adjusted, or indicate that the parameter of the first path cannot be adjusted. For example, S616 may be implemented as: The NNI-PCE in the CCU sends the sixth message to the NNI-PCC in the first OTN device.

If the sixth message indicates that the parameter of the first path can be adjusted, perform S617. If the sixth message indicates that the parameter of the first path cannot be adjusted, perform S618.

S617: The first OTN device adjusts the parameter of the first path, where the first path with the parameter adjusted can satisfy a requirement of the first message.

If the sixth message indicates that the parameter of the first path can be adjusted, the first OTN device may adjust the parameter of the first path based on the parameter requirement of the first message, so that the first path with the parameter adjusted can satisfy the current requirement of the service.

If the technical solutions provided in embodiments of this application are applied to the scenario shown in FIG. 2, after S616 is performed (S616 needs to be replaced with: The transport network controller sends the sixth message to the access network controller, and correspondingly, the access network controller receives the sixth message from the transport network controller), the transport network controller may send second indication information to the first OTN device, where the second indication information may indicate to adjust the parameter of the first path. For example, the second indication information may include the second address information, and may further include other information in the first message, for example, the bandwidth requirement information and/or the delay requirement information. After receiving the second indication information, the first OTN device may perform S617.

S618: The first OTN device sends a fifth message to the OLT device, and correspondingly, the OLT device receives the fifth message from the first OTN device. For example, the fifth message may also be a PCEP message. For example, the first message is a PCEP request message. In this case, the fifth message may be considered as a PCEP reply message of the PCEP request message. For example, S618 may be implemented as follows: The UNI-PCE in the first OTN device sends the fifth message to the UNI-PCC in the OLT device.

If the parameter of the established first path does not need to be adjusted, or the sixth message indicates that the parameter of the first path can be adjusted, the fifth message indicates that the first path is available. If the sixth message indicates that the parameter of the first path cannot be adjusted, the fifth message indicates that the first path is unavailable. To perform S617, S618 may occur after S617, may occur before S617, or may occur at the same time as S617.

If the fifth message indicates that the first path is unavailable, the OLT device may forward the fifth message to the terminal device through the ONT. After receiving the fifth message, the terminal device may learn that the service cannot be performed by the OTN, and the terminal device may take a corresponding measure, for example, may suspend performing the service or change a path. Alternatively, if the fifth message indicates that the first path is available, the OLT device may forward the fifth message to the terminal device through the ONT. After receiving the fifth message, the terminal device may normally perform the service. Alternatively, if the fifth message indicates that the first path is available, the application server subsequently sends data (for example, first data) of the service to the terminal device. Therefore, the OLT device may not need to forward the fifth message to the terminal device. After receiving the data of the service from the application server, the terminal device can determine that the first path is available.

Alternatively, if the technical solutions provided in embodiments of this application are applied to the scenario shown in FIG. 2, when the sixth message indicates that the parameter of the first path cannot be adjusted, the transport network controller may send the sixth message to the first OTN device, as well as to all or some OTN devices except the first OTN device in the OTN. In addition, after receiving the fifth message, the OLT device may forward the fifth message to the terminal device through the ONT. After receiving the fifth message, the terminal device may learn that the service cannot be performed by the OTN, and the terminal device may take a corresponding measure, for example, may suspend performing the service or change a path. Alternatively, if the fifth message indicates that the first path is available, the OLT device may forward the fifth message to the terminal device through the ONT. After receiving the fifth message, the terminal device may normally perform the service. Alternatively, if the fifth message indicates that the first path is available, the application server subsequently sends data (for example, first data) of the service to the terminal device. Therefore, the OLT device may not need to send the fifth message to the terminal device. After receiving the data of the service from the application server, the terminal device can determine that the first path is available.

After S618 is performed, if the fifth message indicates that the first path is available, S612 and S613 may be performed, and only "the second path" in S612 and S613 needs to be replaced with "the first path". Details are not described again.

Optionally, in embodiments of this application, if the terminal device temporarily no longer uses an established path of the service, the first OTN device may delete the path, or may adjust a bandwidth of the path, for example, reduce the bandwidth of the path. That is, the path only needs to be maintained without reserving too much bandwidth for it, thereby saving resources. A corresponding process is described below through some steps.

S619: The OLT device sends a third message to the first OTN device, and correspondingly, the first OTN device receives the third message from the OLT device. The third message may request to delete a path of the service in the OTN, or may request to adjust a bandwidth of the path of the service in the OTN. The path of the service in the OTN described herein is, for example, the second path established in S610, or the first path with the parameter adjusted in S617, or an established first path with no parameter needing to be adjusted. For ease of reference, a path indicated by the third message is referred to as a third path in the following. In FIG. 6B, an example in which the third message is used to request to delete the third path is used. For example, S619 may be implemented as follows: The UNI-PCC in the OLT device sends the third message to the UNI-PCE in the first OTN device.

For example, before the terminal device goes offline or stops using the service, the terminal device may send a notification message to the OLT device through the ONT. The notification message may request to delete the path of the service in the OTN, or may request to adjust the bandwidth of the path of the service in the OTN. After receiving the notification message, the OLT device may send the third message to the first OTN device. For example, if the third message is used to request to adjust the bandwidth of the path of the service in the OTN, the third message and the first message may be messages of a same type. For example, information included in the third message and the first message may be same or similar. In embodiments of this application, a terminal device may actively request to delete a path or adjust a bandwidth of a path. Because a service is used by a terminal device, if the terminal device actively requests to delete a path or adjust a bandwidth of a path, an operation of deleting the path or adjusting the bandwidth of the path can better conform to an execution status of the service. In this way, an impact on services is reduced, and resources are also saved.

Alternatively, a terminal device may not actively request, and an OLT device perceives a behavior of the terminal device. For example, the OLT device may perceive whether the terminal device is offline, or perceive whether the terminal device is performing a service. If the OLT device perceives that the terminal device is offline, or if the OLT device perceives that the terminal device does not perform the service for a period of time, the OLT device may send the third message to the first OTN. A manner in which the OLT device perceives whether the terminal device is offline is that heartbeat data may be maintained between an ONT and the terminal device. If the ONT does not receive the heartbeat data from the terminal device for a first duration, the ONT may notify the OLT device, so that the OLT device considers that the terminal device is offline. A manner in which the OLT device perceives that the terminal device does not perform the service for a period of time is that if the OLT device does not receive, for a second duration, data corresponding to the service from the terminal device or from an application server, the OLT device considers that the terminal device no longer performs the service. In this manner, the terminal device does not need to actively request, thereby reducing a burden of the terminal device and simplifying an implementation of the terminal device.

S620: The first OTN device sends a fourth message to the CCU, and correspondingly, the CCU receives the fourth message from the first OTN device. If the third message requests to delete the third path, the fourth message may be used to request to delete the third path. Alternatively, if the third message requests to adjust a bandwidth of the third path, the fourth message may be used to request to adjust the bandwidth of the third path, or the fourth message may be used to inquire whether the bandwidth of the third path can be adjusted. For example, if the fourth message is used to request to adjust the bandwidth of the path of the service in the OTN, the fourth message and the second message may be messages of a same type. For example, information included in the fourth message and the second message may be same or similar. In FIG. 6B, an example in which the fourth message is used to request to delete the third path is used. The first OTN device may forward the third message to the CCU. In this case, the third message and the fourth message are the same message. Alternatively, the first OTN device may not forward the third message, but generate the fourth message based on the third message. In this case, the third message and the fourth message are different messages. For example, S620 may be implemented as follows: The NNI-PCC in the first OTN device sends the fourth message to the NNI-PCE in the CCU.

That is, the first OTN device may notify the CCU that the third path is to be deleted. Alternatively, the first OTN device cannot determine whether the bandwidth of the third path can be adjusted, so that the first OTN device needs to inquire the CCU.

For example, the second message includes the second address information, and the CCU may determine the third path based on the second address information. If the fourth message is used to request to adjust the bandwidth of the third path, or the fourth message may be used to inquire whether the bandwidth of the third path can be adjusted, the fourth message may further include bandwidth adjustment information, and the bandwidth adjustment information may indicate a bandwidth adjustment amount, or indicate an adjusted bandwidth. The bandwidth adjustment information may be obtained from the third message. Alternatively, the bandwidth adjustment information may not be included in the third message, and the first OTN device determines the bandwidth adjustment information. For example, the adjusted bandwidth may be smaller than the bandwidth before the adjustment, that is, the terminal device may temporarily not use the path, but may use the path again after a period of time. Therefore, the path does not need to be deleted, and the bandwidth of the path may be reduced. In this way, the path can be maintained, and a waste of resources can also be reduced.

S621: The first OTN device deletes the third path or adjusts a bandwidth of the third path. In FIG. 6B, an example in which the first OTN device deletes the third path is used.

If the fourth message is used to request to delete the third path, and the CCU considers that the third path can be deleted, the CCU may not need to reply to the first OTN device. That is, the first OTN device may notify the CCU device that the third path is to be deleted, and the first OTN device may delete the third path. In this case, S620 may be performed before S621, S620 may be performed after S621, or S620 and S621 may be performed simultaneously.

If the fourth message is used to request to adjust the bandwidth of the third path, or the fourth message is used to inquire whether the bandwidth of the third path can be adjusted, after performing S620 or after receiving the fourth message from the first OTN device, the CCU may further send a seventh message to the first OTN device. Correspondingly, the first OTN device receives the seventh message from the CCU. In this case, the seventh message may indicate that the bandwidth of the third path can be adjusted, or indicate that the bandwidth of the third path cannot be adjusted. If the seventh message indicates that the bandwidth of the third path can be adjusted, the first OTN device may adjust the bandwidth of the third path, that is, perform S621. For example, the first OTN device may adjust the bandwidth of the third path based on the bandwidth adjustment information. If the seventh message indicates that the bandwidth of the third path cannot be adjusted, the first OTN device may not adjust the bandwidth of the third path.

Optionally, the first OTN device may further send an eighth message to the OLT device, and correspondingly, the OLT device receives the eighth message from the first OTN device.

If the third message requests to delete the third path, the eighth message may be used to indicate that the third path has been deleted. Alternatively, if the third message requests to adjust a bandwidth of the third path, the eighth message may be used to indicate that the bandwidth of the third path can be adjusted, or indicate that the bandwidth of the third path cannot be adjusted.

After receiving the eighth message, the OLT device may forward the eighth message to the terminal device through the ONT, so that the terminal device can determine whether the third path can be deleted or whether the bandwidth of the third path can be adjusted.

In embodiments of this application, a path in an OTN may be established for a service when a terminal device requests the service. In other words, there is no need to maintain the path for the service in the OTN continuously, thereby reducing a waste of resources, improving a utilization rate of resources, and reducing network construction costs. Alternatively, a bandwidth of an established path may be adjusted when a terminal device initiates a service. In this case, even if a path of the service in an OTN is maintained, the path may be maintained based on a relatively small bandwidth, and the bandwidth may be adjusted only when the path needs to be used. In this way, a waste of resources can be reduced. In addition, in embodiments of this application, because a path of a service in an OTN may be established for the service when the service is initiated, or a bandwidth of an established path may be adjusted, a bandwidth may be configured for the corresponding path based on an actual requirement of the service instead of based on a peak requirement of a user. This can further reduce a waste of resources.

In addition, in embodiments of this application, when a service does not need to be performed, a path of the service in an OTN may be deleted. For example, if a terminal device does not perform a service for a long time, a path of the service in an OTN may be deleted to reduce a waste of resources. Alternatively, when a service does not need to be performed, for example, when a terminal device may not perform a service for a short period of time, and may perform the service again after a period of time, a bandwidth of a path of the service in an OTN may be adjusted to reduce a waste of resources. In addition, the path of the service in the OTN can be maintained, thereby reducing resource consumption caused by path establishment.

Figure 7:
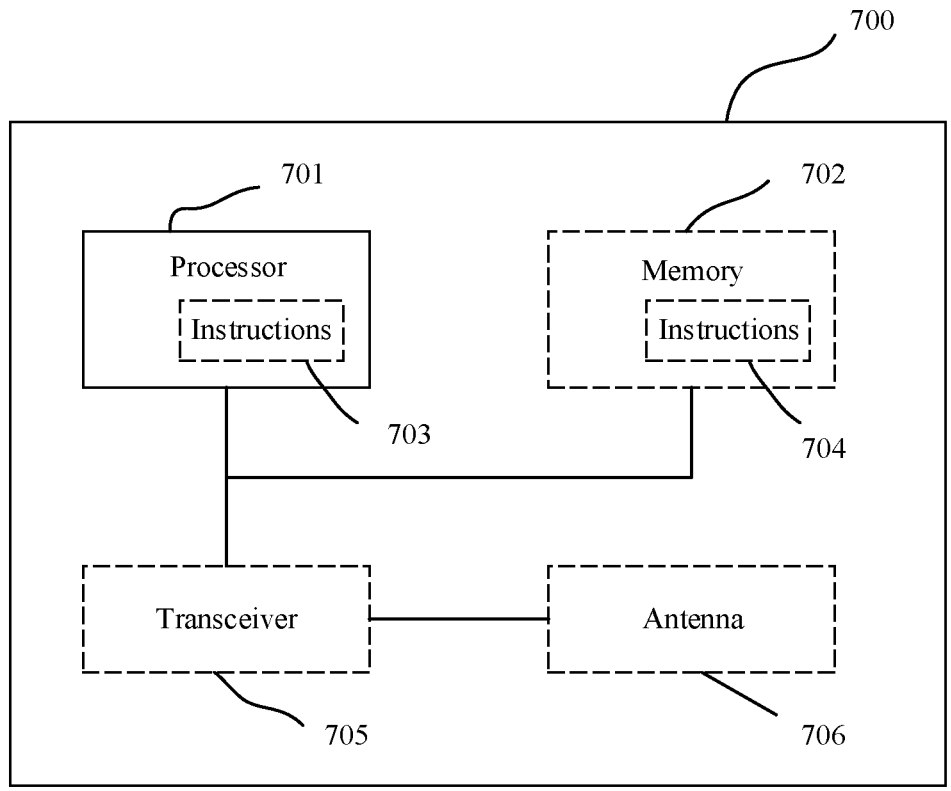
FIG. 7 is a schematic structural diagram of a communication apparatus according to an embodiment of this application.

FIG. 7 is a schematic structural diagram of a communication apparatus according to an embodiment of this application. The communication apparatus 700 may be the first OTN device or the access network controller in the embodiment shown in FIG. 3 or the embodiment shown in FIG. 6A and FIG. 6B, and is configured to implement the method performed by the first OTN device or the access network controller in the foregoing method embodiment. Alternatively, the communication apparatus 700 may be the OLT device in the embodiment shown in FIG. 3 or the embodiment shown in FIG. 6A and FIG. 6B, and is configured to implement the method corresponding to the OLT device in the foregoing method embodiment. For a specific function, refer to the description in the foregoing method embodiment.

The communication apparatus 700 includes one or more processors 701. The processor 701 may also be referred to as a processing unit, and may implement a specific control function. The processor 701 may be a general purpose processor, a special purpose processor, or the like, for example, including: a baseband processor, a central processing unit, an application processor, a modem processor, a graphics processor, an image signal processor, a digital signal processor, a video codec processor, a controller, and/or a neural network processor. The baseband processor may be configured to process a communication protocol and communication data. The central processing unit may be configured to control the communication apparatus 700, perform a software program, and/or process data. Different processors may be independent components, or may be disposed in one or more processing circuits, for example, integrated in one or more application specific integrated circuits.

Optionally, the communication apparatus 700 includes one or more memories 702, configured to store instructions 704, where the instructions may be run on the processor, to enable the communication apparatus 700 to perform the method described in the foregoing method embodiment. Optionally, the memory 702 may also store data. The processor and the memory may be separately disposed, or may be integrated together.

Optionally, the communication apparatus 700 may include instructions 703 (sometimes referred to as codes or a program), and the instructions 703 may be run on the processor, to enable the communication apparatus 700 to perform the method described in the foregoing embodiment. The processor 701 may store data.

Optionally, the communication apparatus 700 may further include a transceiver 705 and an antenna 706. The transceiver 705 may be referred to as a transceiver unit, a transceiver device, a transceiver circuit, a transceiver, an input/output interface, or the like, and is configured to implement a transceiver function of the communication apparatus 700 through the antenna 706.

Optionally, the communication apparatus 700 may further include one or more of the following components: a wireless communication module, an external memory interface, an internal memory, a universal serial bus (USB) interface, a power management module, an antenna, an input/output module, a sensor module, a motor, and so on. It may be understood that in some embodiments, the communication apparatus 700 may include more or fewer components, or some components may be integrated, or some components may be split. These components may be implemented by hardware, software, or a combination of software and hardware.

The processor 701 and the transceiver 705 described in this embodiment of this application may be implemented on an integrated circuit (IC), an analog IC, a radio frequency integrated circuit (RFIC), a hybrid signal IC, an application specific integrated circuit (ASIC), a printed circuit board (PCB), an electronic device or the like. The communication apparatus implementing the description herein may be a standalone device (for example, a standalone integrated circuit), or may be a part of a larger device (for example, a module that can be embedded in another device). For details, refer to the foregoing description of the first OTN device, the access network controller, or the OLT device. Details are not described herein again.

Figure 8:
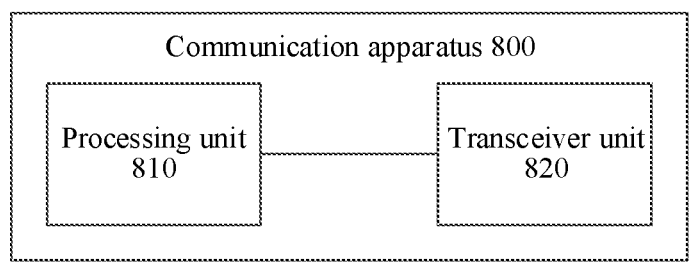
FIG. 8 is a schematic structural diagram of another communication apparatus according to an embodiment of this application.

FIG. 8 is a schematic block diagram of a communication apparatus 800 according to an embodiment of this application. For example, the communication apparatus 800 may implement, for example, a function of the first OTN device or the access network controller described in the embodiment shown in FIG. 3 or FIG. 6A and FIG. 6B.

The communication apparatus 800 includes a processing unit 810. Optionally, the apparatus may further include a transceiver unit 820. For example, the communication apparatus 800 may be a device, for example, the first OTN device or the access network controller. Alternatively, the communication apparatus 800 may be a functional module, for example, a chip used in the first OTN device or another combined device or component that has a function of the first OTN device, or a chip used in the access network controller or another combined device or component that has a function of the access network controller. When the communication apparatus 800 is a device, the transceiver unit 820 may be a transceiver, where the transceiver may include an antenna, a radio frequency circuit, and the like, and the processing unit 810 may be a processor (or a processing circuit), for example, a baseband processor, where the baseband processor may include one or more central processing units (CPUs). When the communication apparatus 800 is a functional module, the transceiver unit 820 may be a radio frequency unit, and the processing unit 810 may be a processor (or a processing circuit), for example, a baseband processor. When the communication apparatus 800 is a chip system, the transceiver unit 820 may be an input/output interface of a chip (for example, a baseband chip), and the processing unit 810 may be a processor (or a processing circuit) of the chip system, and may include one or more central processing units. It should be understood that the processing unit 810 in this embodiment of this application may be implemented by a processor or a processor-related circuit component (or a processing circuit). For example, the processing unit 810 may be implemented by one or more processors 701 in the embodiment shown in FIG. 7. The transceiver unit 820 may be implemented by a transceiver or a transceiver-related circuit component. For example, the transceiver unit 820 may be implemented by a transceiver 705 in the embodiment shown in FIG. 7, or implemented by the transceiver 705 and the antenna 706.

In addition, the transceiver unit 820 may be a functional module, and the functional module can complete both a sending operation and a receiving operation. For example, the transceiver unit 820 may be configured to perform all sending operations and receiving operations performed by the first OTN device or the access network controller in the embodiment shown in FIG. 3 or FIG. 6A and FIG. 6B. For example, when performing a sending operation, the transceiver unit 820 may be considered as a sending unit. When performing a receiving operation, the transceiver unit 820 may be considered as a receiving unit. Alternatively, the transceiver unit 820 may be two functional modules. The transceiver unit 820 may be considered as a collective name of the two functional modules, and the two functional modules are a sending unit and a receiving unit respectively. The sending unit is configured to complete a sending operation. For example, the sending unit may be configured to perform all sending operations performed by the first OTN device or the access network controller in the embodiment shown in FIG. 3 or FIG. 6A and FIG. 6B. The receiving unit is configured to complete a receiving operation. For example, the receiving unit may be configured to perform all receiving operations performed by the first OTN device or the access network controller in the embodiment shown in FIG. 3 or FIG. 6A and FIG. 6B.

The transceiver unit 820 (or the receiving unit) is configured to receive a first message from an OLT device, where the first message includes first address information of a service. The processing unit 810 is configured to determine, based on the first message, whether a first path has been established in an OTN, where the first path is used to transmit the service, and the first path satisfies the first address information. The processing unit 810 is further configured to establish a path for transmitting the service or adjust a bandwidth of the established first path based on a result of the determining.

In an optional implementation, the first address information includes one or more of the following: a source IP address of the service, a destination IP address of the service, an egress address of the service on the first OTN device, and a next-hop address of the service after the service passes through the OTN. The source IP address of the service is an IP address of a terminal device that requests the service, and the destination IP address of the service is an IP address of an application server that provides the service.

In an optional implementation, the processing unit 810 may determine, based on the first message in the following manner, whether the first path has been established in the OTN: determining second address information based on the first address information, and determining, based on the second address information, whether the first path has been established in the OTN. The second address information includes a source device identifier, a destination device identifier, and a slot number of the first path in the OTN.

In an optional implementation, the processing unit 810 may establish, based on a result of the determining in the following manner, a path for transmitting the service: sending a second message to a CCU by the transceiver unit 820

(or the sending unit) when the first path has not been established in the OTN, where the second message is used to request to establish a second path for transmitting the service.

In an optional implementation, the second message further includes second address information, where the second address information includes a source device identifier, a destination device identifier, and a slot number of the second path in the OTN, and the second address information is obtained based on the first address information.

In an optional implementation, the processing unit 810 may adjust, based on a result of the determining in the following manner, the bandwidth of the established first path: determining whether the bandwidth of the first path satisfies a bandwidth requirement of the service when the first path has been established in the OTN. When the bandwidth of the first path does not satisfy the bandwidth requirement of the service, a second message is sent to the CCU by the transceiver unit 820 (or the sending unit), where the second message is used to request to adjust the bandwidth of the first path. An adjusted bandwidth can satisfy the bandwidth requirement of the service.

In an optional implementation, the first message is a PCEP message.

In an optional implementation, the PCEP message is further used to indicate to update a path.

In an optional implementation, the transceiver unit 820 (or the receiving unit) is further configured to receive a third message from the OLT device, where the third message is used to request to delete a path of the service in the OTN. The transceiver unit 820 (or the sending unit) is further configured to send a fourth message to the CCU, where the fourth message is used to request to delete the path of the service in the OTN.

In an optional implementation, the transceiver unit 820 (or the receiving unit) is further configured to receive a third message from the OLT device, where the third message is used to request to adjust a bandwidth of a path of the service in the OTN. The transceiver unit 820 (or the sending unit) is further configured to send a fourth message to the CCU, where the fourth message is used to request to adjust the bandwidth of the path of the service in the OTN. The adjusted bandwidth is smaller than the bandwidth before the adjustment.

The transceiver unit 820 of the communication apparatus 800 may be configured to perform all or some receiving and sending operations of the first OTN device or the access network controller in the embodiment shown in FIG. 3 or FIG. 6A and FIG. 6B. The processing unit 810 may be configured to perform operations other than the receiving and sending operations of the first OTN device or the access network controller in the embodiment shown in FIG. 3 or FIG. 6A and FIG. 6B. Therefore, for more descriptions of functions that can be implemented by the transceiver unit 820 and the processing unit 810, refer to the embodiment shown in FIG. 3 or FIG. 6A and FIG. 6B.

Figure 9:
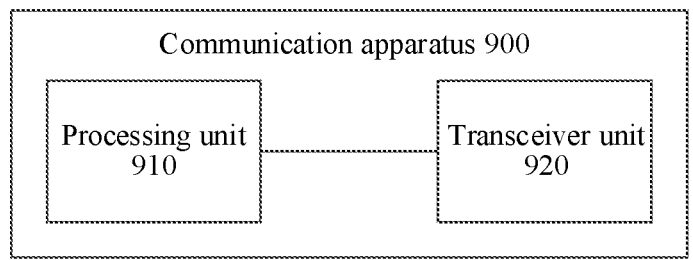
FIG. 9 is a schematic structural diagram of another communication apparatus according to an embodiment of this application.

FIG. 9 is a schematic block diagram of a communication apparatus 900 according to an embodiment of this application. For example, the communication apparatus 900 may implement, for example, a function of the OLT device in the embodiment shown in FIG. 3 or FIG. 6A and FIG. 6B.

The communication apparatus 900 includes a processing unit 910. Optionally, the apparatus may further include a transceiver unit 920. For example, the communication apparatus 900 may be a device, for example, the OLT device. Alternatively, the communication apparatus 900 may be a functional module, for example, a chip used in the OLT device or another combined device or component that has a function of the OLT device. When the communication apparatus 900 is a device, the transceiver unit 920 may be a transceiver, where the transceiver may include an antenna, a radio frequency circuit, and the like, and the processing unit 910 may be a processor (or a processing circuit), for example, a baseband processor, where the baseband processor may include one or more CPUs. When the communication apparatus 900 is a functional module, the transceiver unit 920 may be a radio frequency unit, and the processing unit 910 may be a processor (or a processing circuit), for example, a baseband processor. When the communication apparatus 900 is a chip system, the transceiver unit 920 may be an input/output interface of a chip (for example, a baseband chip), and the processing unit 910 may be a processor (or a processing circuit) of the chip system, and may include one or more central processing units. It should be understood that the processing unit 910 in this embodiment of this application may be implemented by a processor or a processor-related circuit component (or a processing circuit). For example, the processing unit 910 may be implemented by one or more processors 701 in the embodiment shown in FIG. 7. The transceiver unit 920 may be implemented by a transceiver or a transceiver-related circuit component. For example, the transceiver unit 920 may be implemented by a transceiver 705 in the embodiment shown in FIG. 7, or implemented by the transceiver 705 and the antenna 706.

In addition, for an implementation of the transceiver unit 920, refer to the description of the implementation of the transceiver unit 820.

The transceiver unit 920 (or the receiving unit) is configured to receive a first signaling from a terminal device, where the first signaling is used to request to configure a service. The transceiver unit 920 (or the sending unit) is configured to send a first message to a first OTN device, where the first message is used to determine a path of the service in an OTN, and the first message includes first address information of the service.

In an optional implementation, the first address information includes one or more of the following: a source IP address of the service, a destination IP address of the service, an egress address of the service on the first OTN device, and a next-hop address of the service after the service passes through the OTN. The source IP address of the service is an IP address of a terminal device that requests the service, and the destination IP address of the service is an IP address of an application server that provides the service.

In an optional implementation, the first message is a PCEP message.

In an optional implementation, the PCEP message is further used to indicate to update a path.

In an optional implementation, the transceiver unit 920 (or the receiving unit) is further configured to receive a fifth message from the first OTN device, where the fifth message is used to indicate whether the path of the service in the OTN is available or unavailable.

In an optional implementation, the transceiver unit 920 (or the sending unit) is further configured to send a third message to the first OTN device, where the third message is used to request to delete a path of the service in the OTN, or is used to request to adjust a bandwidth of the path of the service in the OTN.

The transceiver unit 920 of the communication apparatus 900 may be configured to perform all or some receiving and sending operations of the OLT device in the embodiment shown in FIG. 3 or FIG. 6A and FIG. 6B. The processing unit 910 may be configured to perform operations other than the receiving and sending operations of the OLT device in the embodiment shown in FIG. 3 or FIG. 6A and FIG. 6B. Therefore, for more descriptions of functions that can be implemented by the transceiver unit 920 and the processing unit 910, refer to the embodiment shown in FIG. 3 or FIG. 6A and FIG. 6B.

A person of ordinary skill in the art may recognize that, in combination with the examples described in embodiments disclosed in this specification, units and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond a scope of this application.

In several embodiments provided in this application, it should be understood that the disclosed system, apparatus and method may be implemented in other manners. For example, the described apparatus embodiment is merely an example. For example, division into the units is merely logical function division. Units described as separate parts may or may not be physically separate, and parts displayed as units may or may not be physical units, may be located in one location, or may be distributed on a plurality of network units. Some or all of the units may be selected based on an actual requirement to achieve an objective of the solutions of the embodiments.

When the functions are implemented in a form of a software functional unit and sold or used as an independent product, the functions may be stored in a computer-readable storage medium. Based on such an understanding, the technical solutions of this application essentially, or a part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing computer-readable storage medium may be any available medium accessible by a computer. The following is used as an example but is not limited: The computer-readable medium may include a random access memory (RAM), a read-only memory (ROM), a programmable ROM (PROM), an erasable PROM (EPROM), an electrically erasable programmable read only memory (EEPROM), a compact disc read-only memory (CD-ROM), a universal serial bus flash disk, a removable hard disk, or another optical disk storage, disk storage medium or another magnetic storage device, or any other media that can be used to carry or store desired program codes in a form of instructions or a data structure and that can be accessed by a computer. In addition, through illustrative but not limited description, many forms of RAMs may be used, for example, a static random access memory (SRAM), a dynamic RAM (DRAM), a synchronous DRAM (SDRAM), a double data rate SDRAM (DDR SDRAM), an enhanced synchronous dynamic random access memory (ESDRAM), a synchronous link DRAM (SLDRAM), or a direct rambus RAM (DR RAM).

The foregoing descriptions are merely specific implementations of this application, but are not intended to limit the protection scope of embodiments of this application. Any variation or replacement that a person skilled in the art can easily figure out within the technical scope disclosed in embodiments of this application shall fall within the protection scope of embodiments of this application. Therefore, the protection scope of embodiments of this application should be subject to the protection scope of the claims.

What is claimed is:

1. A service configuration method, comprising:
receiving, by a first optical transport network (OTN) device, a first message from an optical line terminal (OLT) device, wherein the first message comprises first address information of a service;
determining, by the first OTN device based on the first message, whether a first path has been established in an OTN, wherein the first path is used to transmit data of the service, and the first path satisfies the first address information, wherein the determining, by the first OTN device based on the first message, whether a first path has been established in an OTN comprises:
determining, by the first OTN device, second address information based on the first address information, wherein the second address information comprises a source device identifier, a destination device identifier, and a slot number of the first path in the OTN; and
determining, by the first OTN device based on the second address information, whether the first path has been established in the OTN; and
establishing, by the first OTN device, a path for transmitting data of the service or adjusting a bandwidth of the established first path based on a result of the determining.

2. The method according to claim 1, wherein the first address information comprises one or more of the following:
a source IP address of the service;
a destination IP address of the service;
an egress address of the service on the first OTN device; or
a next-hop address of the service after data of the service passes through the OTN; and
wherein the source IP address of the service is an IP address of a terminal device that requests the service, and the destination IP address of the service is an IP address of an application server that provides the service.

3. The method according to claim 1, wherein the establishing, by the first OTN device, a path for transmitting the data of the service based on a result of the determining comprises:
sending, by the first OTN device, a second message to a central control unit (CCU) when the first path has not been established in the OTN, wherein the second message is used to request to establish a second path for transmitting data of the service.

4. The method according to claim 3, wherein the second message further comprises second address information, wherein the second address information comprises a source device identifier, a destination device identifier, and a slot number of the second path in the OTN, and the second address information is obtained based on the first address information.

5. The method according to claim 1, wherein the adjusting, by the first OTN device, a bandwidth of the established first path based on a result of the determining comprises:

determining, by the first OTN device, whether the bandwidth of the first path satisfies a bandwidth requirement of the service when the first path has been established in the OTN; and sending, by the first OTN device, a second message to a CCU when the bandwidth of the first path does not satisfy the bandwidth requirement of the service, wherein the second message is used to request to adjust the bandwidth of the first path, and an adjusted bandwidth can satisfy the bandwidth requirement of the service.

6. A service configuration method, comprising:

receiving, by an optical line terminal (OLT) device, a first signaling from a terminal device, wherein the first signaling is used to request to configure a service; and sending, by the OLT device, a first message to a first optical transport network (OTN) device, wherein the first message is used to determine a path of the service in an OTN, and the first message comprises first address information of the service, wherein second address information is determined based on the first address information, wherein the second address information comprises a source device identifier, a destination device identifier, and a slot number of a first path in the OTN, and wherein the second address information is used to determine whether the path of the service has been established in the OTN.

7. The method according to claim 6, wherein the first address information comprises one or more of the following:

a source IP address of the service;
a destination IP address of the service;
an egress address of the service on the first OTN device; or
a next-hop address of the service after data of the service passes through the OTN; and
wherein the source IP address of the service is an IP address of the terminal device that requests the service, and the destination IP address of the service is an IP address of an application server that provides the service.

8. The method according to claim 6, wherein the first message is a path computation element communication protocol (PCEP) message.

9. The method according to claim 6, wherein the method further comprises:

receiving, by the OLT device, a second message from the first OTN device, wherein the second message indicates whether the path of the service in the OTN is available or unavailable.

10. The method according to claim 6, wherein the method further comprises:

sending, by the OLT device, a second message to the first OTN device, wherein the second message is used to request to delete the path of the service in the OTN, or is used to request to adjust a bandwidth of the path of the service in the OTN.

11. An optical transport network (OTN) device, comprising:

a transceiver;
at least one processor; and
one or more memories coupled to the at least one processor and storing programming instructions for execution by the at least one processor to:
receive, by the transceiver, a first message from an optical line terminal (OLT) device, wherein the first message comprises first address information of a service;

determine, based on the first message, whether a first path has been established in an OTN, wherein the first path is used to transmit data of the service, and the first path satisfies the first address information, wherein determining, based on the first message, whether the first path has been established in the OTN comprises:

determining second address information based on the first address information, wherein the second address information comprises a source device identifier, a destination device identifier, and a slot number of the first path in the OTN; and determining, based on the second address information, whether the first path has been established in the OTN; and establish a path for transmitting data of the service or adjust a bandwidth of the established first path based on a result of the determining.

12. The OTN device according to claim 11, wherein the first address information comprises one or more of the following:

a source IP address of the service;
a destination IP address of the service;
an egress address of the service on the OTN device; or
a next-hop address of the service after data of the service passes through the OTN; and
wherein the source IP address of the service is an IP address of a terminal device that requests the service, and the destination IP address of the service is an IP address of an application server that provides the service.

13. The OTN device according to claim 11, wherein the programming instructions are for execution by the at least one processor to:

send, by the transceiver, a second message to a central control unit (CCU) when the first path has not been established in the OTN, wherein the second message is used to request to establish a second path for transmitting data of the service.

14. The OTN device according to claim 13, wherein the second message further comprises second address information, wherein the second address information comprises a source device identifier, a destination device identifier, and a slot number of the second path in the OTN, and the second address information is obtained based on the first address information.

15. The OTN device according to claim 11, wherein the programming instructions are for execution by the at least one processor to:

determine whether the bandwidth of the first path satisfies a bandwidth requirement of the service when the first path has been established in the OTN; and send, by the transceiver, a second message to a CCU when the bandwidth of the first path does not satisfy the bandwidth requirement of the service, wherein the second message is used to request to adjust the bandwidth of the first path, and an adjusted bandwidth can satisfy the bandwidth requirement of the service.

16. The OTN device according to claim 11, wherein the first message is a path computation element communication protocol (PCEP) message.

17. The OTN device according to claim 11, wherein the programming instructions are for execution by the at least one processor to:

receive a second message from the OLT device, wherein the second message is used to request to delete a path of the service in the OTN; and send a third message to a CCU, wherein the third message is used to request to delete the path of the service in the OTN.

18. The OTN device according to claim 11, wherein the programming instructions are for execution by the at least one processor to:

receive a second message from the OLT device, wherein the second message is used to request to adjust a bandwidth of a path of the service in the OTN; and send a third message to a CCU, wherein the third message is used to request to adjust the bandwidth of the path of the service in the OTN, and the adjusted bandwidth is smaller than the bandwidth before the adjustment.

\* \* \* \* \*